United States Patent [19]
Johnson et al.

[11] Patent Number: 5,243,455
[45] Date of Patent: Sep. 7, 1993

[54] CHIRAL SMECTIC LIQUID CRYSTAL POLARIZATION INTERFERENCE FILTERS

[75] Inventors: Kristina M. Johnson; Gary D. Sharp, both of Boulder, Colo.

[73] Assignee: The University of Colorado Foundation, Inc., Boulder, Colo.

[21] Appl. No.: 884,644

[22] Filed: May 15, 1992

Related U.S. Application Data

[63] Continuation-in-part of Ser. No. 522,215, May 11, 1990, Pat. No. 5,132,826, and a continuation-in-part of Ser. No. 855,646, Apr. 30, 1992, abandoned.

[51] Int. Cl.$^5$ .............................................. G02F 1/133
[52] U.S. Cl. ...................................... 359/93; 359/53; 359/56; 359/73
[58] Field of Search ................. 359/53, 56, 73, 93, 359/94, 100

[56] References Cited

U.S. PATENT DOCUMENTS

| | | | |
|---|---|---|---|
| 3,540,795 | 11/1970 | Harris | 359/73 |
| 3,912,369 | 10/1975 | Kashnow | 359/73 |
| 4,129,357 | 12/1978 | Title | 359/73 |
| 4,232,948 | 11/1980 | Shanks | 359/94 |
| 4,394,069 | 7/1983 | Kaye | 359/93 |
| 4,563,059 | 1/1986 | Clark et al. | 359/84 |
| 4,674,841 | 6/1987 | Buzak | 359/63 |
| 4,838,663 | 6/1989 | Lagerwall | 359/100 |
| 4,958,916 | 9/1990 | Clark et al. | 359/84 |
| 5,132,826 | 7/1992 | Johnson et al. | 359/93 |

FOREIGN PATENT DOCUMENTS

| | | |
|---|---|---|
| 0233418 | 8/1987 | European Pat. Off. . |
| 2238200 | 7/1974 | France . |
| 9009614 | 8/1990 | PCT Int'l Appl. . |

OTHER PUBLICATIONS

Title et al. (Dec. 1981) Opt. Eng. 20:815.
Evans (Mar. 1948) J. Opt. Soc. Am. 39:229.
Weis et al. (Sep. 1987) J. Opt. Soc. Am. 4:1720.
Andersson et al. (Aug. 1987) Appl. Phys. Lett. 51:640.
Langerwall et al. (1989) Ferroelectrics 94:3–62.
PCT International Examination Report for PCT/US90/06288, dated Mar. 14, 1992.
PCT International Search Report, for PCT/US90/06288 dated Mar. 4, 1991.
Funfschilling et al. (Oct. 1989) J. Appl. Phys. 66(8):3877–3882.
Sharp et al. (May 1990) Opt. Lett. 15(10):523–525.
Sharp et al. (1991) Ferroelectrics 114:55–69.
Masterson et al. (Nov. 1989) Opt. Let. 14(22):1249–1251.
Andersson et al. (Nov. 1989) J. Appl. Phys. 66(10):4983–4995.

*Primary Examiner*—William L. Sikes
*Assistant Examiner*—Huy K. Mai
*Attorney, Agent, or Firm*—Greenlee and Winner

[57] ABSTRACT

Discretely and continuously tunable single and multiple-stage polarization interference filters employing chiral smectic liquid crystal cells as electronically rotatable retarders are provided. Discretely tunable filters of this invention include those which employ bistable surface-stabilized ferroelectric liquid crystal cells. Continuously tunable filters of this invention include those that employ chiral smectic A ferroelectric liquid crystal cells. Single stage filters include fixed birefringent elements in combination with chiral smectic liquid crystal cells and multiple stage filters can include only chiral smectic liquid crystal cells or can include chiral smectic liquid crystal cells in combination with fixed birefringent elements. Blocking filters useful for color generation and color displays are also provided. The FLC filters provided can be temporally multiplexed.

33 Claims, 18 Drawing Sheets

400 -x- 800   0 -y- 1

400 -x- 800   0 -y- 8

CHIRAL SMECTIC LIQUID CRYSTAL POLARIZATION INTERFERENCE FILTERS

This application is a continuation-in-part of U.S. Ser. No. 522,215 filed May 11, 1990 now U.S. Pat. No. 5,132,826 and U.S. patent application Ser. No. 07/855,646, filed Apr. 30, 1992, now abandoned both of which are incorporated in their entirety by reference herein.

FIELD OF THE INVENTION

The present invention relates to tunable optical filters and display elements which employ chiral smectic liquid crystal materials, particularly ferroelectric liquid crystal materials, in tuning elements and to color generation using such filters.

BACKGROUND OF THE INVENTION

The surface stabilized ferroelectric liquid crystal (SSFLC) cell has been shown to possess properties useful in optical shutters and a number of other optoelectronic device applications requiring high contrast ratio or large modulation depth. These include electrooptic shutters, spatial light modulators for opto-electronic computing, and flat panel display devices. In such devices, the speed of response is often important. This response speed is given approximately by the equation:

$$\tau = \frac{1.8\eta}{PE}$$

where $\tau$ is the optical response (10%-90%) to an applied electric field of magnitude E, $\eta$ is the orientational viscosity, and P is the ferroelectric polarization density. FLC cells combine moderately fast switching speeds, with low voltage requirements and high contrast.

The physics and operation of the surface stabilized FLC (SSFLC) cells have been extensively described (Clark, N. A. et al. (1983) Mol. Cryst. Liq. Cryst. 94:213; and in U.S. Pat. Nos. 4,367,924, 4,563,059, 4,813,767, 4,840,463 and 4,958,916 all of Clark and Lagerwall). An SSFLC cell is typically formed of uniformly-spaced transparent or semi-transparent retaining walls of an inert substrate, like glass. The inside surface of the substrate walls is provided with transparent or semitransparent electrodes. A FLC composition, often a mixture of components, is inserted between the uniformly-space transparent electrodes and the FLC molecules are aligned with respect to the substrate walls and electrodes. In an SSFLC, smectic layers are aligned perpendicular to the substrate walls which bound the FLC layer. In a SmC. SSFLC the molecular director $\hat{n}$, i.e., the optic axis of the cell, makes an angle $\alpha$ to the smectic layer normal ($\hat{z}$) in the plane of the substrate walls. Application of an appropriate electric field to the cell electrodes allows selection between two $\hat{n}$ orientation states separated by $2\alpha$. For many SmC* FLC mixtures, $\alpha = \pm 22.5°$, so the SmC* SSFLC cell can act like a retarder which can be electronically rotated by 45°. The voltage requirements for SSFLC switching devices are modest ($\pm 10V$), and power consumption is quite low because the voltage need not be applied to maintain the FLC in the switched state, i.e., the devices are bistable (Clark, N. A. and Lagerwall, S. T. (1980) Appl. Phys. Lett. 36:899). Typical switching times for SmC* SSFLC cells are <44 $\mu$s at room temperature (ZLI-3654 mixture available from E. Merck, D-6100 Darmstadt 1, Frankfurter, Strabe, 250, F.R.G.).

Light valves have been based upon the so called electroclinic effect in chiral smectic A (SmA*) LC materials. These devices exhibit several attractive features (see, Anderson et al. (1987) Appl. Phys. Lett. 51:640), including very fast response and voltage regulated gray scale. A number of SmA* materials have been shown to display an electroclinic effect when incorporated into SSFLC type cells. The applied voltage induces a variation in $\alpha$ in these materials in an analog fashion up to a maximum $\alpha_{MAX}$. The effect is described as being linear in applied voltage with very rapid response. SmA* materials having $\alpha_{MAX}$ up to about 22.5° are known in the art although $\alpha_{MAX}$ is most often less than 22.5°.

The distorted helix ferroelectric (DHF) effect has been described with smectic C* liquid crystals having a short pitch (see: Ostrovski and Chigrinov (1980) Krystallografiya 25:560; Ostrovski et al. in *Advances in Liquid Crystal research and Application*. (L. Bata, ed.) Pergamon, Oxford; Funfschilling and Schadt (1989) J. Appl. Phys. 66:3877). In SSFLC cells incorporating certain short-pitch materials, the helix of the material is not suppressed, and thus the helix can be distorted by the application of an electric field. This distortion results in a electric field-dependent, spatially-averaged change in the tilt angle of the material coupled with a voltage-dependent variation in spatially averaged birefringence. DHF cells are attractive since induced tilt angles as high as about $\pm 38°$ can be attained with applied voltages lower than those required for SmA* electroclinic and SmC* SSFLC cells. Beresnev et al., EPO Patent Application EP 309,774, published Apr. 5, 1989, describe DHF cells. DHF materials are further described in Buchecker et al., EP 339,414, published Nov. 2, 1989.

Birefringent or polarization interference filters were first used in solar research where sub-angstrom spectral resolution is required to observe solar prominences. The first type of birefringent filter was invented by Lyot (Lyot, B. (1933) Comptes rendus 197:1593) in 1933. The basic Lyot filter (Yariv, A. and Yeh, P. (1984) *Optical Waves in Crystals*, Chapter 5, John Wiley and Sons, New York) can be decomposed into a series of individual filter stages. Each stage consists of a birefringent element placed between parallel polarizers. The exit polarizer for a particular stage acts as the input (or entrance) polarizer for the following stage. In a Lyot-type filter, fixed birefringent elements are oriented with optic axes parallel to the interface and oriented at 45°; the direction of the input polarization. The thickness, and therefore the retardation of the birefringent elements, increases geometrically in powers of two for each successive stage in the conventional Lyot geometry. Lyot-like filters in which thicknesses of the birefringent elements in successive stages increase in various arithmetic, geometric and other mathematic progressions, such as in a Fibinacci series (i.e., 1,1,2,3,5 ...) have been implemented. Multiple stage devices have been demonstrated with high resolution (0.1 angstrom) and broad free-spectral-range (FSR) (entire visible spectrum) (Title, A. M. and Rosenberg, W. J. (1981) Opt. Eng. 20:815).

More recently, research in optical filters has focused on tuning the wavelength of peak transmission. An optical filter which can be rapidly tuned has applications in remote sensing, signal processing, displays and wavelength division multiplexing. Tunability of otherwise fixed frequency Lyot filters has been suggested and implemented using various techniques (Billings, B. H. (1948) J. Opt. Soc. Am. 37:738; Evans, J. W. (1948) J. Opt. Soc. Am. 39:229; Title, A. M. and Rosenberg, W. J. (1981) Opt. Eng. 20:815). These include mechanical methods such as stretching plastic sheets in series with the birefringent elements (Billings, B. H. (1948) J. Opt. Soc.Am. 37:738), mechanically rotating waveplates or sliding wedge plates (Title, A. M. and Rosenberg, W. J. (1981) Opt. Eng. 20:815 and Evans, J. W. (1948) J. Opt. Soc. Am. 39:229), changing the retardation of the birefringent elements by temperature tuning the birefringence, or changing the birefringence using electro-optic modulators (Billings, B. H. (1948) J. Opt. Soc.Am. 37:738). Temperature tuning and mechanical tuning methods are inherently slow. Electro-optic tuning of known filter devices, while much more rapid, requires large drive voltages and is limited in bandwidth by material breakdown voltages for the thin birefringent elements required (Weis, R. S. and Gaylord, T. K. (1987) J. Opt. Soc. Am. 4:1720).

Other electronically tunable filters, which have been demonstrated include acousto-optic tunable filters (AOTF) (Harris, S. E. and Wallace, R. W. (1969) J. Opt. Soc. Am. 59:744; Chang, I. C. (1981) Opt. Eng. 20:824), electro-optic tunable filters (EOTF) (Pinnow, D. A. et al. (1979) Appl. Phys. Lett. 34:391; Lotspeich, J. F. et al. (1981) Opt. Eng. 20:830), multiple-cavity Fabry-Perot devices (Gunning, W. (1982) Appl. Opt. 21:3129) and hybrid filters such as the Fabry-Perot electro-optic Sölc filter (Weis, R. S. and Gaylord, T. K. (1987) J. Opt. Soc. Am. 4:1720).

The operation of the AOTF is based on the interaction of light with a sound wave in a photoelastic medium. Strong acousto-optic interaction only occurs when the Bragg condition is satisfied. Therefore, only one spectral component of incident radiation is diffracted from the structure at a given acoustic frequency. Tuning is accomplished by changing the acoustic frequency. This was the first electrically tunable filter, which succeeded in varying the transmission wavelength from 400 nm to 700 nm by changing the acoustic frequency from 428 MHz to 990 MHz with a bandwidth of approximately 80 nm (Harris, S. E. and Wallace, R. W. (1969) J. Opt. Soc. Am. 59:744). Current AOTF's have 12° fields of view, high throughput, high resolution and broad tunability (Chang, I. C. (1981) Opt. Eng. 20:824). However, power requirements are high for many applications (on the order of 10 watts/cm$^2$) and frequency shifts induced by the filter prohibit the use of AOTF's in laser cavities. Furthermore, in AOTF's there is a tradeoff between resolution and tuning speed.

The electro-optic tunable filter (EOTF) consists of a Y-cut LiTaO$_3$ platelet, placed between crossed polarizers, with an array of separately addressable finger electrodes (Pinnow, D. A. et al. (1979) Appl. Phys. Lett. 34:391). Tunability is accomplished by applying a spatially periodic (sinusoidal) voltage to the 100 electrodes. Current applications of this device, however, utilize more elaborate programmable passband synthesis techniques (Lotspeich, J. F. et al. (1981) Opt. Eng. 20:830). While the power requirements for the EOTF are low, it suffers from a small clear aperture and field-of-view. This is also the main disadvantage of the Fabry-Perot devices.

Color switching has been described in liquid crystal displays which incorporate dichroic dyes (see: e.g. Aftergut et al. U.S. Pat. No. 4,581,608). Buzak U.S. Pat. No. 4,674,841 refers to a color filter switchable between three output colors incorporating a variable retarder which is a twisted nematic liquid crystal cell. Nematic liquid crystals have also been used for tuning optical filters (Kaye, W. I., U.S. Pat. No. 4,394,069; Tarry, H. A. (1975) Elect. Lett. 18:47; Gunning, W. (1980) Proc. SPIE 268:190; and Wu, S. (1989) Appl. Opt. 28:48). A disadvantage of these filters is their slow tuning speed (~100 ms), which is a particular problem in high resolution applications since the switching speed decreases as the order of the retarder increases. These filters are also limited in spatial resolution and angular viewing capability.

Clark and Lagerwall in U.S. Pat. No. 4,367,924 "Chiral Smectic C or H Liquid Crystal Electro-Optical Device" refer to color control as an attribute of their FLC electro-optic device and state that "(the) sample birefringence and orientation of the two polarizers can be manipulated to give color effects." It appears that the authors refer to the rotation of exit polarizers to select color.

Clark and Lagerwall in U.S. Pat. No. 4,563,059 "Surface Stabilized Ferroelectric Liquid Crystal Devices" refer to color production using FLC. At least two methods of color production are discussed. The first involves using spatial multiplexing of a 2×2 pixel array containing FLC cells placed between polarizers to generate four colors where the FLC cells of each pixel in the array have a different thickness. The second method involves the use of two sequential FLC layers to give 4 colors.

Ozaki et al. (1985) Jpn. J. Appl. Phys. (part 24 (suppl.24-3):63 refers to a high speed color switching element in which dichroic dyes are mixed with ferroelectric liquid crystals. Color switches and or displays which combine color filters and ferroelectric liquid crystal cell shutters have been described. See: e.g. Seikimura et al. U.S. Pat. No. 4,712,874; Takao et al. U.S. Pat. No. 4,802,743; Yamazaki et al. U.S. Pat. No. 4,799,776; Yokono et al. U.S. Pat. No. 4,773,737.

Carrington et al. (1989) Second International Conference on Ferroelectric Liquid Crystals Program and Abstracts (Göteborg, Sweden, 27-30 Jun. 1989) Abstract 015 refers to rapid switching of spatial arrays of FLC two color switches in color displays.

Lagerwall et al. (1989) "Ferroelectric Liquid Crystals: The Development of Devices" Ferroelectrics 94:3-62 is a recent review of the use of FLC cells in device applications. In a section called "SSFLC Color" the reviewers refer to color display (e.g. for television applications). Matsumoto et al. (1988) SID88 Digest, 41, refers to color generation via pixel subdivision using FLC cells. Each pixel of a display is divided into three (or more) sub-pixels of blue, green and red. Disadvantages of this technique for color generation include a reduction in resolution and the complexity of fabrication of large, high resolution displays. Ross (1988) International Display Research Conference (1988) 185 refers to color sequential backlighting using FLC cells. This method is implemented by switching between blue, green and red images at sufficient rates that the eye averages the primary color images. The method involves switching of a wavelength selective source synchronously with images on a liquid crystal display. Three primary colors (usually red, green and blue) define an area in color space. Desired colors in the area can be displayed by controlling the level of primary colors in each pixel. Backlighting liquid crystal displays uses fluorescent tubes with fast phosphors (White (1988) Phys. Technol. 19:91).

SUMMARY OF THE INVENTION

This invention provides discretely and continuously tunable optical filters comprising chiral smectic liquid crystal (CSLC) cells as electronically rotatable tuning elements. Discrete or continuous wavelength (or frequency) tuning is accomplished by discrete or continuous rotation, respectively, of the optic axes of CSLC cells in a filter. For certain applications with slow response detectors, continuous tuning can be obtained by rapid tuning of discrete filters among spectral outputs.

The filters of this invention can contain one or more optically coupled stages. A filter stage is bounded by an entrance polarizer which defines the polarization of light entering the stage and an exit polarizer which selects or analyzes the polarization exiting a stage. The filter configurations specifically described herein require that the light entering a stage is linearly polarized. The exit polarizer of a stage is oriented at a fixed angle with respect to the polarization of light entering the stage. In a multiple-stage filter, the exit polarizer of one stage is typically the entrance polarizer for the next stage along the light path through the filter.

In one embodiment, single stage filters of this invention contain a fixed birefringent element in combination with and optically coupled to an electronically tunable CSLC cell. A single stage filter having one fixed birefringent element and a stable binary surface-stabilized ferroelectric liquid crystal (SSFLC) cell which selects between two wavelengths of light on application of an electric field to the SSFLC cell is specifically exemplified herein. Single stage filters can contain more than one CSLC cell and the optic axes of the CSLC cells in the single stage filter may be rotated, i.e., switched between optic axis orientations, synchronously or independently.

An alternate embodiment of this invention are single stage filters which contain three or more electronically tunable CSLC cells which are independently switchable or with one or more of the cells synchronously switchable between or among the possible optic axis orientations.

Multiple stage filters, of this invention contain at least one stage having a CSLC cell. Preferably each stage of a filter contains at least a fixed birefringent element or a CSLC cell. A stage in a multiple stage filter can contain only CSLC cells as active birefringent elements (or retarders) or can contain fixed birefringent elements or both fixed birefringent elements and CSLC cells. Multiple stage filters can contain identical stages, i.e., those having the same number, kind and thicknesses of active and fixed birefringent elements. Preferably each stage of the filter is different either in number of CSLC cells or fixed birefringent elements in the stage or in the retardation of the elements. A stage of a multiple stage filter can contain more than one CSLC cell and the CSLC cells within a stage may be independently rotated or one or more of the cells can be synchronously rotated. Analogously, CSLC cells in different stages of a multiple stage filter can be rotated synchronously or independently.

CSLC cells of this invention include those in which the optic axis is discretely or continuously rotatable. Discretely and continuously tunable CSLC cells are said to be tunable or switchable between optical states characteristic of the orientations of the optic axis. CSLC cells are, thus, specific examples of active birefringent elements CSLC cells include but are not limited to those which are ferroelectric liquid crystal cells, electroclinic-effect liquid crystal cells and distorted helix ferroelectric liquid crystal cells. CSLC cells which have a discrete number of possible optic axis orientations include stable binary state SSFLC cells having two optic axis orientations and ternary state antiferroelectric-effect liquid crystal cells having three optic axis orientations. Analog CSLC cells can be operated in a multiple discrete-state mode having two or more different optic axis orientations which are electronically selectable by choice of applied voltage. Analog CSLC cells include but are not limited to surface stabilized chiral smectic A liquid crystal cells and distorted helix ferroelectric liquid crystal (DHF) cells.

Birefringent elements of this invention include any optically anisotropic materials which display multiple indices of refraction. The use of uniaxial elements is specifically described herein, but biaxial materials can also be used. Fixed birefringent elements include among others birefringent crystals, stretched polymer layers, and holographic elements.

Active birefringent elements are those in which the retardation can be selectively changed, for example, electronically as in CSLC cells in which the orientation of the optic axis of the cell can be electronically rotated or as in nematic liquid crystal cells in which the birefringence of the cell can be electronically changed.

The polarizers of this invention include any means for generating, separating, selecting or analyzing polarized light including, among others, polarizing beam splitters, particle polarizers and polarization sensitive filters. The filters specifically described herein employ linear polarizers which are preferred for many filtering applications. The filters of this invention can readily be adapted to employ circular and elliptical polarizers.

The CSLC cells of the filters of this invention are electronically rotated by means of application of an electric field across cell electrodes. Any means that achieves the desired rotation can be employed. A direct voltage can be applied to the cell or some form of varying voltage can be applied. An electric field can be induce by activating a photosensor with light. The applied field can be electrically or optically induced by any means known in the art.

In general, the number, kind, thickness, relative orientations of active and fixed birefringent elements with respect to the polarization of light entering a stage and the relative positions of elements within a stage as well as the relative orientations of polarizers in a stage are selected to achieve the desired spectral outputs. For improved resolution it is preferred that the optic axis of a fixed birefringent element within a stage is oriented at ±45° with respect to the plane of polarization of light entering the stage. Typically, the CSLC cells are oriented in a stage such that one of the possible optic axis orientations of the cell is at 0°, ±45° or 90° to the plane of polarization of light entering that stage. Typically the polarizers which bound a stage of the filter will be crossed or parallel. Since the output of a fixed or active birefringent element is elliptically polarized, the output spectra of a filter of this invention can depend on the relative order of CSLC cells and birefringent elements in a stage. Furthermore, the output spectra of a stage having more than one CSLC cell will depend on the switching pattern of the cells, i.e., on whether the optic axes of one or more of the cells are synchronously or independently rotated.

For high resolution applications, filters having stages which include at least one fixed birefringent element are preferred.

In specific embodiments of the multiple stage filters of this invention, the CSLC cells and birefringent elements in one stage are selected to have a specific relative retardation compared to corresponding elements in another stage of the filter. For example, specific filters of this invention are filters having a specific relative geometry of elements in different stages. More specifically, the thicknesses and, thus, the retardation of the CSLC cells and birefringent elements in the stages of a filter can be varied in an arithmetic, geometric or other mathematical progression to achieve desired outputs for a desired application, such as to achieve improved resolution. For example, this invention provides multiple stage Lyot-type filters, in which the thicknesses of the CSLC cells and birefringent elements in the stages of the filter vary by a geometric progression. In a multiple stage filter, the thicknesses of the CSLC cells and/or fixed birefringent element of the stages vary from the stage with the thinnest elements to the stage with the thickest elements by a geometric progression. For example, in a filter having S stages, the thicknesses of birefringent elements of the stages can vary by the progression $2^0, 2^1, 2^2, \ldots, 2^{S-1}$. The order of stages along the light path through the filter does not effect the transmission function of the filter.

Another example of the discretely tunable filters of this invention are blocking filters which are particularly useful as color blocking filters. Color blocking filters for display applications preferably produce three colors and more preferably produce a saturated red, green and blue for color display applications. Blocking filters of this invention are implemented with discrete state CSLC cells and can include fixed birefringent elements. In a specific example, a two stage filter having five bistable SSFLC cells capable of generating saturated red, blue and green is provided. A three color filter, preferably giving red, green and blue, can also be generated by employing a two-color output filter coupled with a prefiltered light source.

The discretely tunable filters of this invention can be temporally multiplexed by rapid rotation of the optic axis of the discrete state CSLC cells. Filters which can generate two or more wavelengths or transmission outputs are useful for temporal multiplexing. Three color blocking filters are particularly useful in temporal multiplexing in color display application where the human eye is the slow response detector. Temporal multiplexing of a such a three color filter can result in a perception of a wide range of colors by an observer. The colors perceived by the observer in a multiplexed color filter are linear combinations of the three colors generated by the filter. The driving scheme of the CSLC cells in such a filter is selected to generate output spectra appropriate to the desired application.

A specific embodiment of a continuously tunable filter of this invention contains one or more optically coupled stages in which a stage is bounded by an entrance polarizer which defines the polarization of light entering the stage and an exit polarizers which is oriented at a fixed angle with respect to the polarization of light entering the stage. A stage contains a birefringent element which can be active or fixed, an achromatic quarter-waveplate and one or more analog chiral smectic liquid crystal cells optically coupled between the polarizers. Means for applying a variable electric field to the analog chiral smectic liquid crystal cells is provided such that the optic axes of the cells can be rotated in an analog manner as a function, for example, of the magnitude and sign of the applied field. Analog SmA* CSLC cells are rotatable between $\pm a_{MAX}$, the maximum tilt angle, which is a characteristic of the liquid crystal material in the cell. The achromatic quarter-waveplate is positioned between the birefringent element and the series of analog chiral smectic liquid crystal cells in a stage and functions to transform elliptically polarized light exiting one (active or fixed) birefringent element to linearly polarized the light before it enters the other (active or fixed) birefringent element. Two or more analog CSLC cells can be optically coupled in sequence to increase the tuning bandwidth of a filter stage. In order to increase the tuning bandwidth, the optic axes of sequential CSLC cells in the series of cells are rotated in opposite directions. In the continuously tunable filters having analog CSLC cells, it is preferred that the fixed birefringent element is oriented at $\pm 45°$ with respect to the input polarization.

Filters of this invention, most generally, include those in which one or more discretely tunable filter stages are combined with one or more continuously tunable filter stages and/or with passive filter stages containing a fixed birefringent element. Continuously tunable filter implemented with one or two SmA* FLCs are specifically exemplified.

The filters of this invention require polarized input and generate a polarized output. The filters of this invention can be readily adapted to be polarization insensitive by polarization diversity methods which are well known in the art. The light source may be broad band or a mixture of narrow wavelength bands. The light entering the filter may be prefiltered to pass a particular band pass or series of wavelength peaks. The filters of this invention can be employed with any non-monochromatic light source.

The discretely and continuously tunable filters of this invention can be readily adapted as reflection-mode devices.

BRIEF DESCRIPTION OF THE FIGS.

FIG. 1 illustrates a single stage of a smectic C* FLC tunable binary wavelength filter. The net retardation of the stage can be modulated by electronically rotating the optic axis of the FLC waveplate. FIG. 1A illustrates the reflection mode of the single stage of a filter of FIG. 1.

FIG. 2 illustrates a three stage Lyot-type filter incorporating SmC* SSFLC waveplates. This device contains four polarizers (P1-P4), seven SSFLC waveplates (LC1-LC7) and three birefringent elements (B1-B3), which are 1-wave, 2-wave, and 4-wave retarders at the design wavelength.

FIG. 3(a-b, views 3(a) and 3(b), compares experimental transmission (closed circles) of the three stage Lyot filter of FIG. 2 with simulation results (solid line). View 3(a) compares the measured transmission spectrum of the three stage Lyot filter, in which the SSFLC cells are in the unswitched state to simulation results and view 3(b) compares the measured transmission spectrum of the same filter in which the SSFLC cells are in the switched state.

FIG. 4 illustrates computer simulated superimposed transmission curves for a 5 stage, 6 channel SSFLC-based tunable filter. The filter has transmission peaks at 450 nm, 492 nm, 530 nm, 566 nm, 600 nm and 634 nm.

FIG. 5 illustrates an exemplary chromaticity diagram for visible wavelengths (See: Naussau (1983) *The Physics and Chemistry of Color*, Wiley Interscience, New York, Chapter 1.) Colors are indicated and wavelengths are indicated in nanometers (nm). The color corresponding to standard daylight $D_{65}$ is indicated. The diagram given is generalized and is provided to illustrate that three colors define a color space.

FIG. 6 illustrates a four-stage, two-channel, Lyot-type filter used to implement temporal multiplexing of FLC cells to achieve continuously varying visual color generation. P1–P5 are parallel polarizers which define the four filter stages. B1–B4 are fixed birefringent elements which are λ, 2 λ, 4 λ and 8 λ waveplates, respectively, at 540 nm. C1–C4 are FLC cells of varying optical thickness. The thickness of the FLC layer in cell C1 is 0.6 μm, that of C2 of 1.2 μm, that of C3 is 2.4 μm and that of C4 is 4.8 μm. The FLC cells in all of the filter stages are synchronously switched. In the unswitched state the filter transmit green light (540 nm). In the switched state the filter transmits red light.

FIG. 7 illustrates the driving schemes employed to obtain visual color mixing of red and green light in the FLC filter device of FIG. 6. When the cells are unswitched, the design wavelength is transmitted (green), view a. When the cells are switched, the second color (red) is transmitted, view e. When the filter is switched between transmission of green and red, with each color on for approximately the same time using the driving scheme of view c, a yellow color is observed. When the filter is tuned to green for a higher percentage of the switching period using the driving scheme of view b, a yellow-green color is observed. When the filter is tuned to red for a higher percentage of the switching period using the driving scheme of view d, an orange color is observed. The colors listed in the Figure are those observed by a subject believed to have normal color vision.

FIG. 8 illustrates a two-stage multiple wavelength blocking filter, incorporating fast switching SSFLC cells (FLC 1–5). The stages are defined by polarizers P1–P3 and there are two FLC cells in a first stage bounded by crossed polarizers and three FLC cells in a second stage, bounded by parallel polarizers. The filter is designed to selectively transmit three visible colors (red, green and blue), and is capable of rapid color switching to generate a visual display of a continuous range of visible colors.

FIG. 9 (*a–e*) compares experimental transmission of stages of the filter of FIG. 8. Spectrum 9(*a*) is the transmission of stage 1 with FLC2 switched; Spectrum 9(*b*) is the transmission of stage 1 with both FLC1 and FLC2 switched; Spectrum 9(*c*) is the transmission of stage 2 with FLC5 switched; Spectrum 9"*d*" is the transmission of stage 2 with FLC4 and FLC5 switched; and Spectrum 9(*e*) is the transmission of stage 2 with FLC3, FLC4 and FLC5 switched. In each case, 9(a–e), the actual transmission (solid line) is compared to a computer simulation of the transmission as a function of wavelength.

FIG. 10(*a–c*) compares experimental transmission spectra of primary colors (blue (465 nm), green (530 nm), and red (653 nm); spectra 10(*a–c*), respectively) from the blocking filter of FIG. 8. In each case, the actual transmission (solid line) is compared to a computer simulation of the transmission as a function of wavelength.

FIG. 11 is a chromaticity diagram for the RBG spectra produced by the two stage filter of FIG. 8.

FIG. 12 illustrates a smectic A* liquid crystal cell with the molecules arranged in a bookshelf geometry and in the z-y plane of the containing glass plates. Application of an electric field (E) switches the molecules from the unperturbed state along the layer normal (z axis) denoted by n(0), to the tilted state n(E). Tilt angle is a function of applied field.

FIG. 13 illustrates a single stage smectic A* FLC continuously tunable filter containing two FLC half-waveplates, the optic axis of which are rotatable in opposite directions in order to increase the tuning range. The device is tuned to a desired wavelength by electronically rotating the optical axes of the FLC half-waveplates.

FIG. 14(*a–c*), views 14(*a–c*), compares measured transmission (circles) of the filter illustrated in FIG. 13 to simulation results (solid lines). Transmission is shown as a function of wavelength (400–800 nm). Normalized transmission is indicated along the y axis. The transmission scale in view 14(*a*) is 0 to 1 and in views 14(*b*) and 14(*c*) it is 0 to 0.8. View 14(*a*) compares experimental and calculated transmission with the FLC waveplates in the unswitched state. View 14(*b*) compares experimental and calculated transmission with the FLC waveplates tuned toward the blue and view 14(*c*) compares experimental and calculated transmission with the FLC waveplates tuned toward the red.

FIG. 15 illustrates a computer simulation of the transmission of a three-stage Lyot filter incorporating smectic A* liquid crystal half-waveplates. Transmission is shown as a function of wavelength (480–600 nm). The device has a full width at half maximum (FWHM) of 10 nm with continuous tunability over 70 nm.

DETAILED DESCRIPTION OF THE PREFERRED EMBODIMENTS

Figure 1:
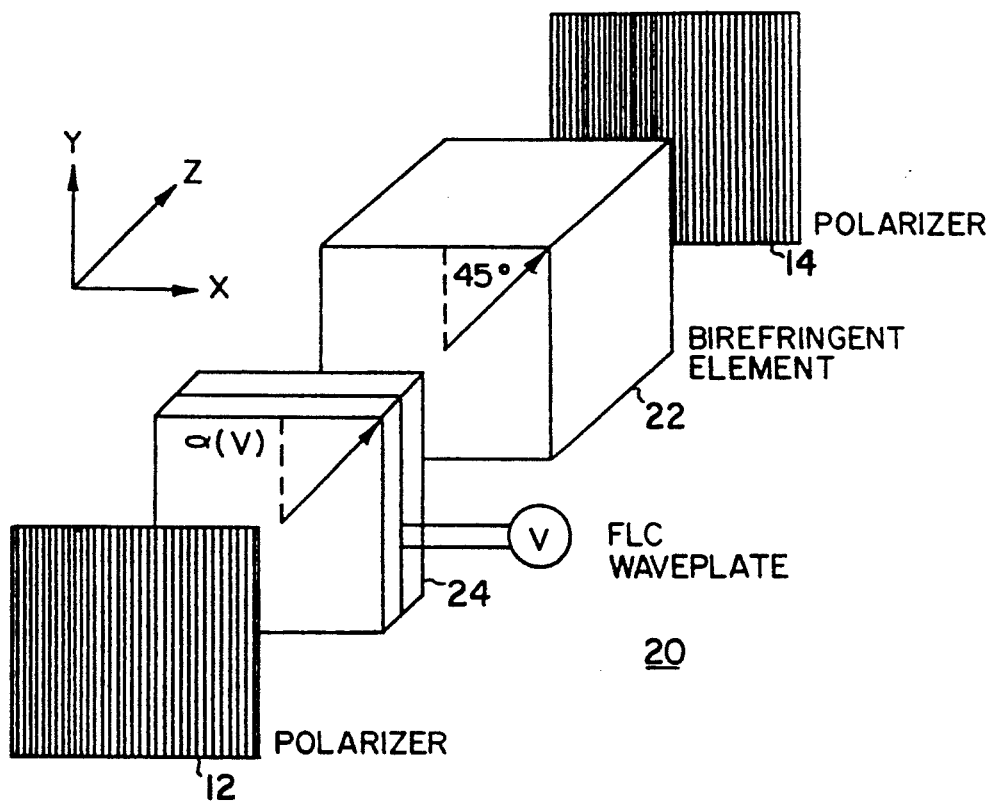

The term chiral smectic liquid crystal (CSLC) cell is used generally herein to refer to transparent or semi-transparent cells containing a aligned layer of a chiral smectic liquid crystal material which functions on application of an electric field to cell electrodes to rotate the polarization of light passing through the cell. Cells are typically formed of uniformly-spaced transparent or semi-transparent retaining walls of an inert substrate, such as glass or quartz. A conducting material is typically coated on the inside surface of the substrate walls to provide transparent or semi-transparent electrodes. A chiral nonracemic smectic liquid crystal composition, often a mixture of components, is inserted between the uniformly-space transparent electrodes. A method of alignment of the ferroelectric liquid crystal molecules within the cell is typically employed. One preferred alignment is the "bookshelf" alignment of which has been described by Clark and Lagerwall, supra. In a bookshelf aligned CSLC cell, smectic layers are aligned perpendicular to the substrate walls which bound the LC layer. In a chiral smectic C CSLC cell, the molecular director n̂ makes an angle α to the smectic layer normal (ẑ). In a chiral, smectic A CSLC cell (so called electroclinic effect cell), n̂ is aligned with ẑ in the field free state. Application of an electric field induces n̂ to tilt with response to ẑ. The molecular director is the average direction of the long axis of the molecule in the layer. Surface stabilization suppresses the formation of a helix in the smectic layer within the material so that the molecular director, i.e., the optic axis is confined to rotate in the plane of the substrate walls. Surface stabilization is required for SmC* and SmA* planar-aligned cells. In a discrete, multi-state FLC cell, for example a bistable surface stablized FLC cell like a SmC* SSFLC cell, application of an appropriate electric field to the cell electrodes allows selection between molecular director orientations—two orientations separated by $2\alpha$ in the case of the bistable SSFLC. The discrete states of the cell are associate with the discrete orientations of the optic axis of the cell in the plane of the substrate walls of the cell. In a discrete state CSLC cell, for example, the application of a voltage, above a certain threshold voltage, to the cell electrodes result in switching of the orientation of the chiral smectic LC molecules. Bistable cells have two such orientations. Tristable cells have three such orientations. With a multi-stable state CSLC cell, a voltage need not be applied to maintain the orientation of the CSLC molecules which defines the state of the cell. In a CSLC cell in which all of the states are not stable, it can be necessary to apply a voltage to maintain the cell in a desired state.

Analog CSLC materials, for example SmA*. electroclinic materials and DHF materials, when incorporated into CSLC cells and aligned in a planar, bookshelf geometry display an analog rotation of the cell optic axis with applied electric field. The maximum rotation angle that can be obtained is twice the maximum tilt angle ($\alpha_{MAX}$) of the electroclinic or DHF material employed in the cell. In the alternative, analog CSLC cells can be operated in a multi-state mode by appropriate application of an electric field to the cell electrodes. DHF materials in addition to the field dependent rotation of the optic axis, display a voltage dependent change in birefringence ($\delta\Delta n$) which should be considered when DHF cell thicknesses are selected.

Homeotropic alignment is an alternative CSLC cell alignment in which the smectic layers are parallel to the substrate walls (which in this case may or may not be the aperture of the cell). The electric field is applied to such a cell across the smectic layers, i.e., parallel to the layers by electrodes that are lateral to the substrate walls. The layer normal is $\hat{z}$. The liquid crystal molecules are aligned with respect to each other within the smectic layers by wellknown techniques such as by application of an aligning electric field during cell preparation. The molecular director ($\hat{n}$) makes an angle $\alpha$ with respect to ($\hat{z}$). Application of an electric field across the layers rotates $\hat{n}$ in a plane perpendicular to the direction of the E field. Homeotropically aligned CSLC cells can be employed in an analogous manner to bookshelf aligned CSLC cells in the filters of the present invention to rotate the plane of polarized light in a filter stage.

The present invention provides discretely tunable filters in which CSLC cell waveplates function as electronically controllable phase retarders that are incorporated into stages of the filter. Single and multiple stage filters are provided. The inclusion of such a retarder in a filter stage does not affect the spectral transmission through the filter when the optic axis of the retarder is parallel to the plane of polarization of light entering the filter stage. Rotation of the optic axis of the CSLC waveplate by an appropriate angle is equivalent to changing increasing or decreasing the thickness of the birefringent element and results in a change in spectral transmission through the stage. Electronically rotating the optic axis of the CSLC waveplate between the possible molecular director orientations effectively changes the design wavelength of the filter and allows tuning between wavelengths.

The operation of a discretely tunable birefringent filter using CSLC cells can be understood by reference to the single filter stage shown in FIG. 1. This filter stage 20, formed by entrance 12 and exit 14 polarizers contains a fixed birefringent element 22 and a CSLC cell 24, which is a bistable SSFLC. The direction of light propagation is along the z axis of the cartesian coordinate system, indicated in FIG. 1. The faces of the birefringent element and the SSFLC cell are perpendicular to the z axis. Linearly polarized light (the plane of polarization of which is in the yz plane enters the filter stage. The exit polarizer 14 is parallel to the entrance polarizer. The optic axis of the SSFLC cell 24 rotates, as indicated, in the plane perpendicular to the z axis. The optic axis of the bistable SSFLC cell can be switched between two orientations separated by $2\alpha$ in the yx plane. The SSFLC cell is oriented in the stage such that one of its possible optic axis orientations is parallel to the plane of polarization of light entering the cell. Thus, on application of a voltage step across the SSFLC cell the optic axis of the cell rotates between 0° and $2\alpha$, which for many chiral smectic FLC materials is 45°. The optic axis of fixed birefringent element 22 is oriented at 45° with respect to the polarization of light entering the cell. For convenience of description of the operation of the bistable SSFLC, the state of the SSFLC in which the optic axis of the cell is parallel to the entering polarization is called the "unswitched" state and the other state is called the "switched" state. When the SSFLC is in the unswitched state it has no effect on incident linearly polarized light. After passage through the SSFLC, the incident polarized light enters the fixed birefringent element and is divided into two equal amplitude eigenwaves, which travel at different phase velocities through the birefringent material. The two waves interfere at the exit polarizer 14 such that only wavelengths that are in phase achieve unity transmission. The transmission spectrum for the unswitched state depends on the retardation of the fixed birefringent element ($\Gamma^F$). When the SSFLC cell is switched the transmission spectrum of the stage depends on the retardation of both the fixed birefringent element and the SSFLC cell. Thus, switching the SSFLC between its two states results in tuning between two transmission spectra.

Figure 1A:
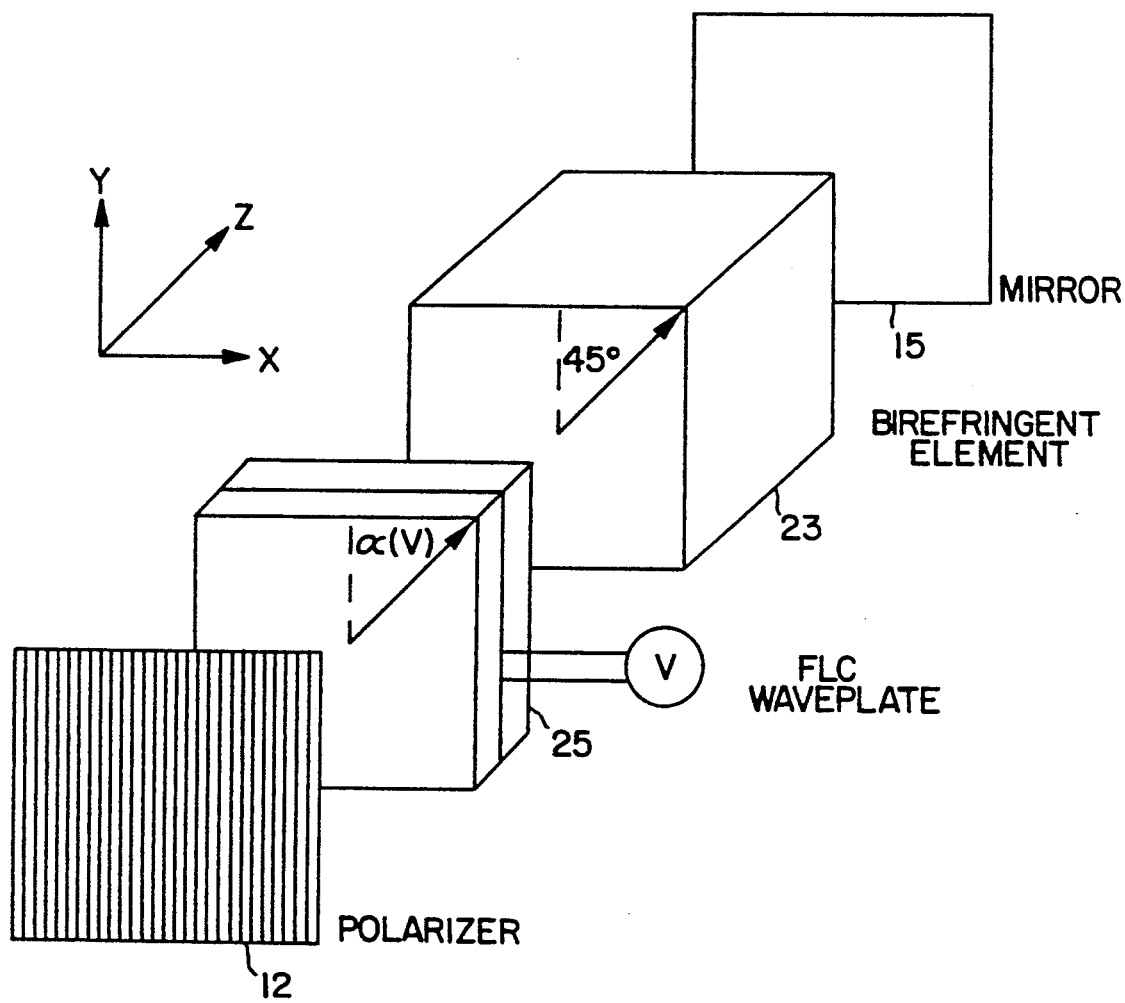

For reflection mode operation of the tunable birefringent filter, the final polarizer is replaced with a reflective means such as a mirror. This is illustrated for a single filter stage in FIG. 1A. Polarizer 14 is replaced with mirror 15. Since each element is traversed twice in reflection mode, the retardance of each element is halved relative to the analogous transmission mode filter, as is known in the art. The retardance of fixed birefringent element 23 is half that of element 22 and the retardance of CSLC cell 25 is half that of cell 24.

Figure 2:
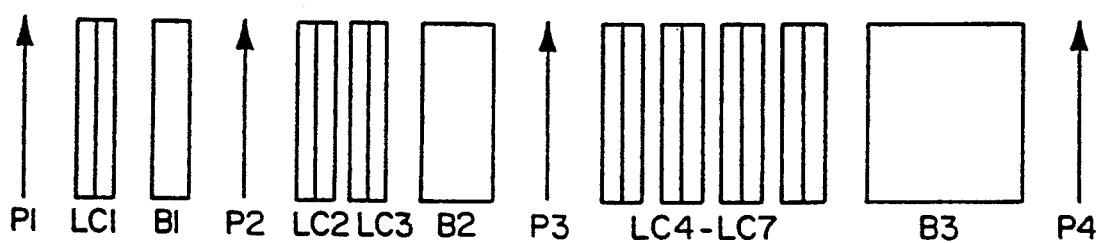
Figure 3A:
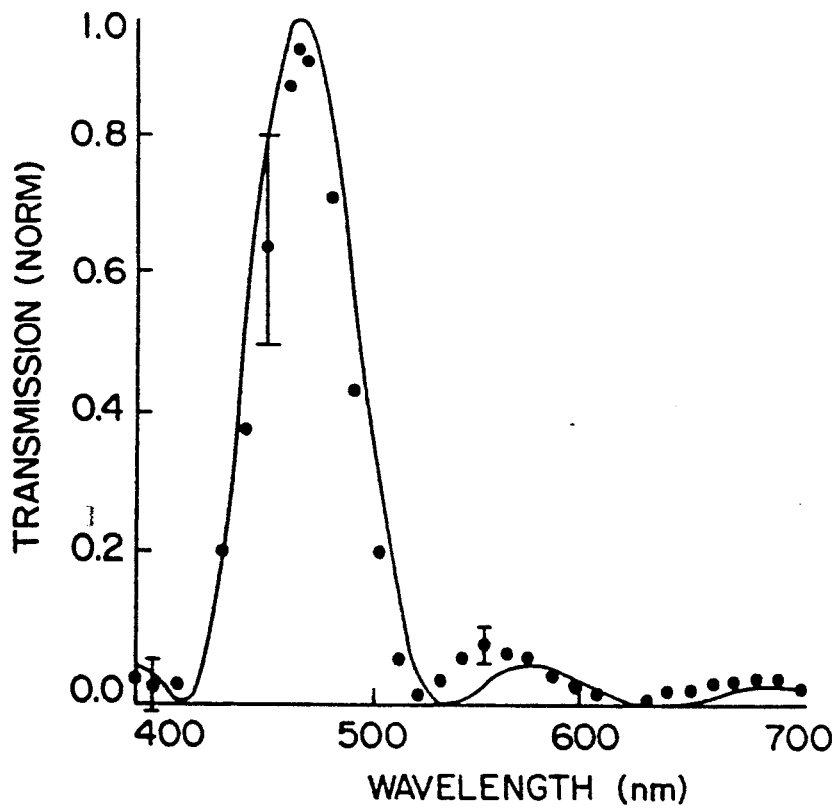
Figure 3B:
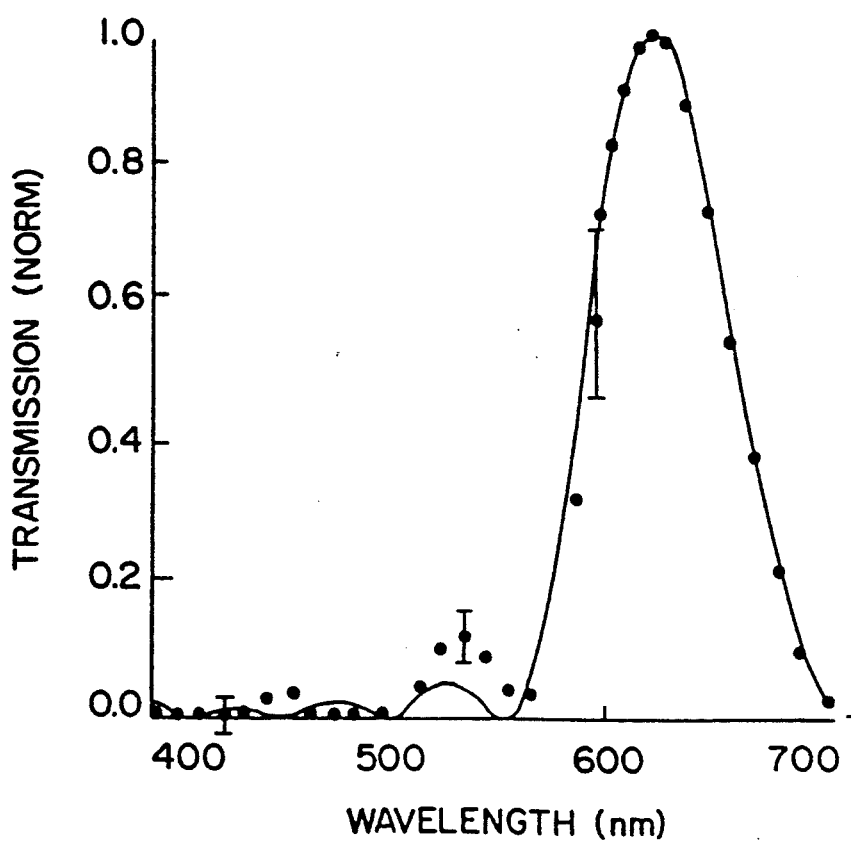

A multiple-stage discretely tunable Lyot-type filter is shown in FIG. 2. Referring to FIG. 2, the three-stage filter comprises four polarizers P1–P4, for example dichroic sheet polarizers, which are all parallel The filter contains three fixed birefringent elements (one in each stage): B1, B2, B3, which retard light at 475 nm by one wave, two waves, and four waves, respectively The thickness of the birefringent elements in the different stages vary in a geometric progression to achieve a Lyot geometry. Each of the stages of the filter contains bistable SSFLC cells which are half-wave at 400 nm and are thus all the same thickness. To achieve the Lyot geometry, the stages of the filter contain one, two and four SSFLCs (LC1-LC7), respectively. In the unswitched state of the filter, the optic axes of each of the SSFLCs in a stage of the filter are parallel to the plane of polarization of light entering that stage. The transmission spectrum of the filter in the unswitched state depends on the combined retardation of the birefringent elements B1-B3. The bistable SSFLCs (again with $\alpha = 22.5°$) of the filter were synchronously switched between the unswitched state and the switched state (in which the optic axes of the cells are at 45° with respect to the polarization entering the stage) by application of a voltage step. Employing a 280W tungsten lamp as the light source, the filter output was analyzed with a photodiode, an HP 1726A oscilloscope, and a monochromator. The transmission spectra of the filter are plotted in FIG. 3a (unswitched) and FIG. 3b (switched) along with numerical solutions of theoretical curves obtained by substituting the values for G(T)d and $\lambda^*$ into Equations 1 and 10 (infra). The experimental transmission spectra have maxima at 475 nm and 625 nm, which agrees quite well with theoretical curves (taking into account the dispersion of the SSFLCs).

The order of the stages of the filter of FIG. 2 does not effect the transmission spectra of the filter. The multiple SSFLC cells of the filter of FIG. 2 can be replaced with SSFLCs which vary in thickness, i.e., the four SSFLCs of stage three of the filter can be replaced with a single SSFLC that has an FLC layer four times as thick.

The exemplified multiple stage filter of FIG. 2 was not optimized for maximum transmission and aperture size. However, Lyot filters have long been considered attractive for these very attributes. High quality fixed frequency Lyot filters are capable of transmitting 35-40% of incident unpolarized light (Evans, J. W. (1948) J. Opt. Soc. Am. 39:229). Well known means for optimizing birefringent filters including Lyot-type filters can be applied to the filters of the present invention.

A mathematical description of the operation of a Lyot-type filter of the present invention which contains fixed birefringent elements in combination with discretely switchable CSLC cells is provided herein. This description assumes binary state SSFLCs having $2\alpha = 45°$, the optic axes of which are aligned with (or perpendicular to) the input polarization in the unswitched state and fixed birefringent elements that are at ±45° to the input polarization.

The retardation between the two waves at the exit of a birefringent element (oriented at ±45° to the input polarization) is given by:

$$\Gamma(\lambda) = \frac{2\pi \Delta n d}{\lambda} \quad (1)$$

wherein $\Delta n$ is the birefringence of the material, d is the material thickness and $\lambda$ is the free space wavelength. The two waves interfere at the exit polarizer such that only wavelengths that are in phase achieve unity transmission. The transmission spectrum for the $n^{th}$ stage of a Lyot-type filter is given by:

$$T_n(\lambda) = \cos^2[\Gamma_n(\lambda)/2] \quad (2)$$

The transmission of a multiple stage filter is the product of the intensity transmittances of the individual filter stages. In a conventional Lyot filter, the thickness of the birefringent elements in different stages increase in a geometric progression. The transmission spectrum of an N stage filter can be written in the form of a replicated sinc function (Yariv, A. and Yeh, P. (1984) Optical Waves in Crystals, Chapter 5, John Wiley and Sons, New York).

$$T(\lambda) = \frac{\sin^2 \frac{2^N \pi \Delta n d}{\lambda}}{4^N \sin^2 \frac{\pi \Delta n d}{\lambda}} \quad (3)$$

The spectral period of the filter, or FSR, is determined by the stage with the thinnest birefringent elements. The resolution of the filter is determined by the thickest elements. The transmission of a Lyot-type filter (or any other multiple-stage birefringent filter) does not depend on the order of the stages, i.e., the stages in the filter need not be ordered by increasing thickness of birefringent elements.

The transmission spectrum of a single filter stage can be determined using the 2×2 Jones calculus (Jones, R. C. (1941) J. Opt. Soc. Am. 31:488). These results can easily be extended to a multiple stage Lyot-type device. The output of the $n^{th}$ stage can be represented by the matrix equation $$E'_n(\lambda) = P_y W_n(\lambda) P_y E_n(\lambda) \quad (4)$$

where $E_n(\lambda)$ and $E'_n(\lambda)$ are the column vectors giving the x and y components of the input and transmitted electric fields, respectively, $P_y$ is the matrix representing polarizers oriented along the y axis and $W_n(\lambda)$ is the matrix for a retarder with optical axes oriented at ±45° about the z axis. These matrices are expressed as (Yariv, A. and Yeh, P. (1984) Optical Waves in Crystals, Chapter 5, John Wiley and Sons, New York)

$$P_y = \begin{vmatrix} 0 & 0 \\ 0 & 1 \end{vmatrix}, \quad W_n(\lambda) = \begin{vmatrix} \cos[\Gamma_n(\lambda)/2] & -i\sin[\Gamma_n(\lambda)/2] \\ -i\sin[\Gamma_n(\lambda)/2] & \cos[\Gamma_n(\lambda)/2] \end{vmatrix} \quad (5)$$

where the retardation, $\Gamma_n(\lambda)$, is given by $$\Gamma_n(\lambda) = \Gamma^F_n(\lambda) + \Gamma^C_n(\lambda) \quad (6)$$

Here, $\Gamma^F_n(\lambda)$ is the retardation of the fixed birefringent element given by Equation 7 as $$\Gamma^F_n(\lambda) = 2^n \pi (\lambda_A/\lambda) \quad (7)$$

where $\lambda_A$ ($= \Delta n d$) is the design wavelength of the filter in the unswitched state. This is the wavelength at which the birefringent element in the first stage is a full-waveplate, assuming the $n = 1$ corresponds to a zero-order full-waveplate and the specific orientation of filter elements shown in FIG. 1. Equation 7 assumes negligible dispersion of the birefringent elements throughout the tuning range. $\Gamma^C_n(\lambda)$ is the additional retardation due to the $2^{n-1}$ FLC's. In the unswitched state, this retardation is zero. In the switched state ($2\alpha = \pm 45°$), the filter is tuned to a second wavelength, $\lambda_B$, due to the additional retardation. This retardation can therefore be written as $$\Gamma_n{}^c(\lambda) = \begin{cases} 0 & \text{Unswitched} \\ 2^n\pi \dfrac{\Delta\lambda}{\lambda} \dfrac{\Delta n(\lambda)}{\Delta n(\lambda_B)} & \text{Switched} \end{cases} \quad (8)$$

where $\Delta n(\lambda)$ is the wavelength dependent birefringence of the FLC's and $\Delta\lambda = (\lambda_B - \lambda_A)$. Due to the highly dispersive nature of liquid crystals, this expression includes the effect of dispersion of the FLC birefringence. Using Equations 4 and 5 and the relation $T(\lambda) = |E'_y(\lambda)/E_y(\lambda)|^2$ yields the intensity transmission given by Equation 2, where $$\Gamma_n(\lambda) = \begin{cases} 2^n\pi\lambda_A & \text{Unswitched} \\ \dfrac{2^n\pi}{\lambda}\lambda_A + \Delta\lambda\dfrac{\Delta n(\lambda)}{\Delta n(\lambda_B)} & \text{Switched} \end{cases} \quad (9)$$

A model describing the birefringence of liquid crystals based on a modified version of the Clausius-Mosotti equation of molecular polarizability has been recently proposed (Wu, S. (1986) Phys. Rev. A 33 1270). This analysis has shown excellent agreement with experiment and allows us to express the FLC birefringence, $\Delta n$, as $$\Delta n(T, \lambda) = G(T)\dfrac{\lambda^2(\lambda^*)^2}{\lambda^2 - (\lambda^*)^2} \quad (10)$$

where $G(T)$ is a temperature dependent parameter in units of $nm^{-2}$, which is a function of the difference in transition oscillator strengths between the extraordinary and ordinary directions for light incident on the liquid crystal molecules, and $\lambda^*$ is the mean U.V. resonance wavelength. In order to obtain the parameters required in the above equation the transmission characteristics of the FLC's placed between parallel and crossed polarizers were analyzed. Experimentally measured values for these parameters are: $G(T)d = 2.08 \times 10^{-3} nm^{-1}$ and $\lambda^* = 245.0$ nm.

The experimentally determined filter transmission spectra of the three-stage Lyot-type filter of FIG. 2 were compared in FIG. 3 with spectra calculated using the equations presented in the foregoing analysis. The transmission spectrum of a desired multiple stage Lyot geometry filter of the present invention can be modeled in a similar manner to the theoretical curves presented in FIG. 3.

Figure 4:
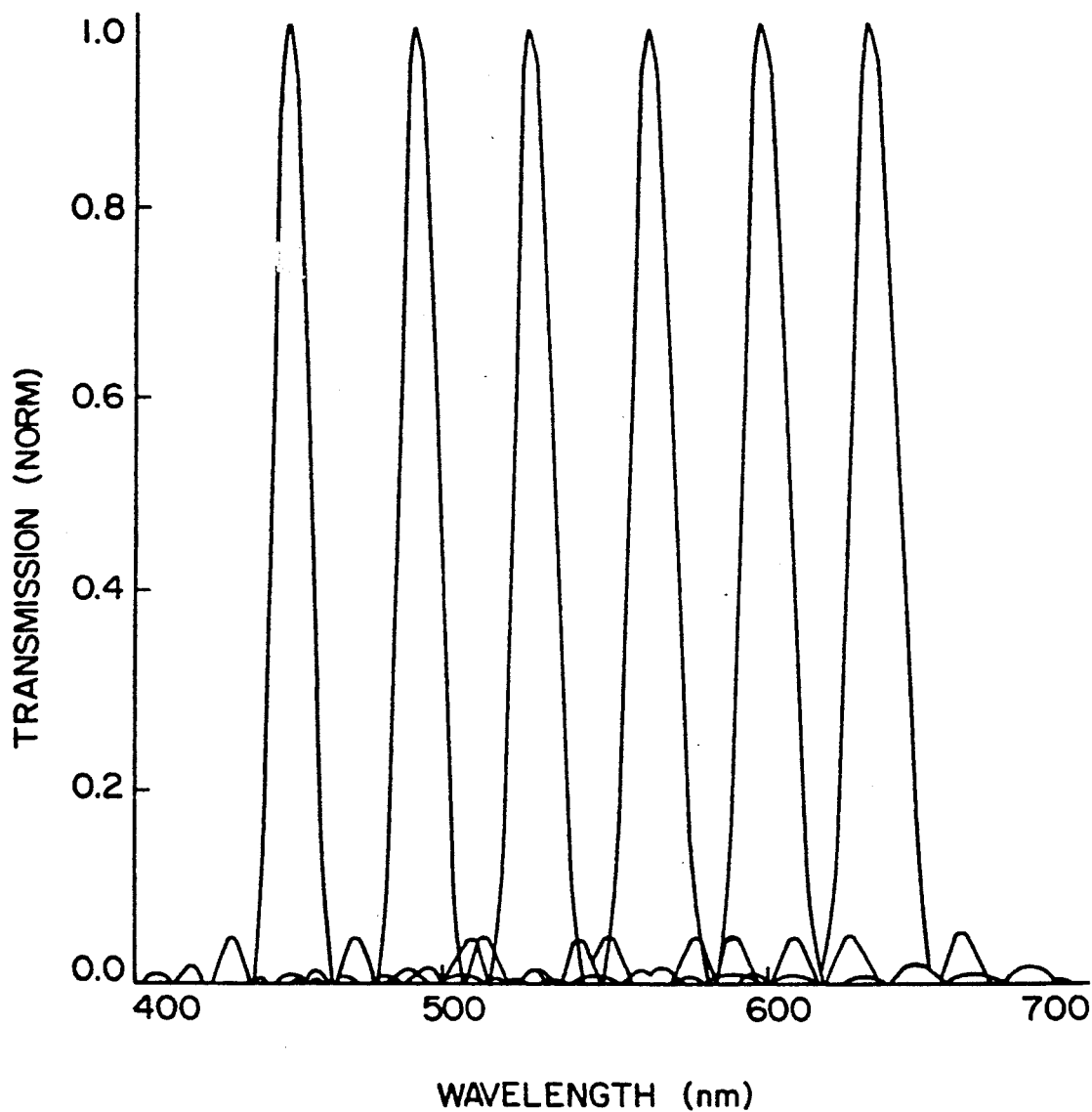

A computer model of the filter transmission spectrum of a six-channel, five-stage Lyot-type filter is shown in FIG. 4. This figure superimposes the theoretical transmission vs. wavelength curves for a six channel, five stage Lyot-type FLCTF which employs 5 FLC cells in the first stage. Each of these cells give a retardation of $\pi/4$ at a wavelength of $\lambda = 400$ nm. Due to dispersion in the FLC's, the channels are separated by nearly 50 nm with an approximate 10-nm bandwidth. As stated above, such transmission simulations require an experimental determination of certain transmission characteristics of the FLC cells. For the SSFLC cells of the filter of FIG. 2 which gave the transmission spectra of FIG. 3 the measured values for $G(T)d$ is $2.08 \times 10^{-3} nm^{-1}$ and $\lambda^*$ is 245.0 nm.

The model filter contained at least five bistable SSFLC cells and a birefringent element in each stage. The thicknesses of all filter elements (FLC cells and birefringent elements) increased in the geometric progression 1, 2, 4, 8, with increasing numbers of stages. In a case in which the required FLC thickness is greater than the thickness limits of a surface-stabilized cell ($\sim 0.5 - \sim 10$ µm), more than one synchronously switched cells can be used to achieve the desired thickness. The order of stages does not effect transmission, but the ratio of thicknesses of the elements within a given stage to the thickness of the corresponding element in another stage is constant in the Lyot geometry. The relative thickness of the elements in different stages affects transmission. If, for example, the thickness of the birefringent element in a first stage is 3 times the thickness of that element in a second stage, then the ratio of thickness of each corresponding FLC cell in the first stage to the corresponding FLC cell in the second stage must be 3.

The number of outputs that can be obtained by independent switching of the discrete CSLC cells in a filter is $P^N$ where P is the number of discrete optic axis orientations of the CSLC cell and N is the number of independently switched CSLC cells. For example, a stage containing two bistable SSFLC cells can be switched between four selected transmission spectra (including the unswitched state). A stage containing one birefringent element and two FLC cells can also be switched between four transmission spectra.

Within a stage of a discretely tunable filter of the present invention, the relative orientations of the polarizers is fixed, but can be selected to obtain a desired transmission spectrum. Similarly, while in many applications the fixed birefringent element will be oriented at an angle of 45° with respect to the plane of polarization of light entering a filter stage, this angle can also be selected to obtain a desired transmission spectrum. Further, while in many applications one of the optic axis orientation of the CSFLC cell will be oriented at 0°, ±45° or 90° with respect to the plane of polarization of light entering a stage, the orientations of the optic axes of the CSLC cells can be adapted to obtain a desired transmission spectrum.

The thickness of the birefringent element and the thicknesses of any CSLC cells employed in the filters are also selected to achieve a desired output transmission spectrum.

The discrete filters herein have been described for use with an apparently white light source. Sources other than white light can be employed. The source should be non-monochromatic, but can be limited to a particular passband of wavelength or to a particular set of peaks generated, for example, by prefiltering.

A unique characteristic of CSLC cells is their fast switching speeds (order of 10's to 100's of µsec). Filters of the present invention are capable of >10 kHz tuning rates, for example between two or more discrete wavelengths. In situations where relatively slow response detectors are used, such as with photographic or movie film, or the human eye, pseudo colors can be generated using the rapidly switching filters described herein. Rapid switching between two primary color stimuli can be used to generate other colors, as perceived by the slow detector, which are mixtures of the primary colors. For example, the two monochromatic stimuli, 540 nm (green) and 630 nm (red) can be mixed in various portions to create the perception of orange (600 nm) and yellow (570 nm). Optically, this mixing can be done by varying the quantity of power of the primary stimuli in a transmission. The same result can be achieved by switching between the two stimuli (spatially superimposed or closely adjacent) at rates faster than the response time of the eye (or any detector which averages over may periods). Colors can be generated in this way using the filters described herein by varying the time for which the filter is tuned to any particular primary stimulus compared to another primary stimuli. By changing the percentage of a square wave period during which the filter is tuned to one of the primary stimuli with respect to another (i.e., varying the duty cycle of an applied voltage, for example), there is a perceived generation of colors which are mixtures of the primary inputs. In effect, the quantity of optical power transmitted in each primary stimulus is varied by changing the ratio of time which the filter is tuned to each of the primary bands. The response time of the eye is about 50 Hz. The eye will thus average optical power over many cycles of filter switching, and many colors can be generated for visual detection.

Figure 5:
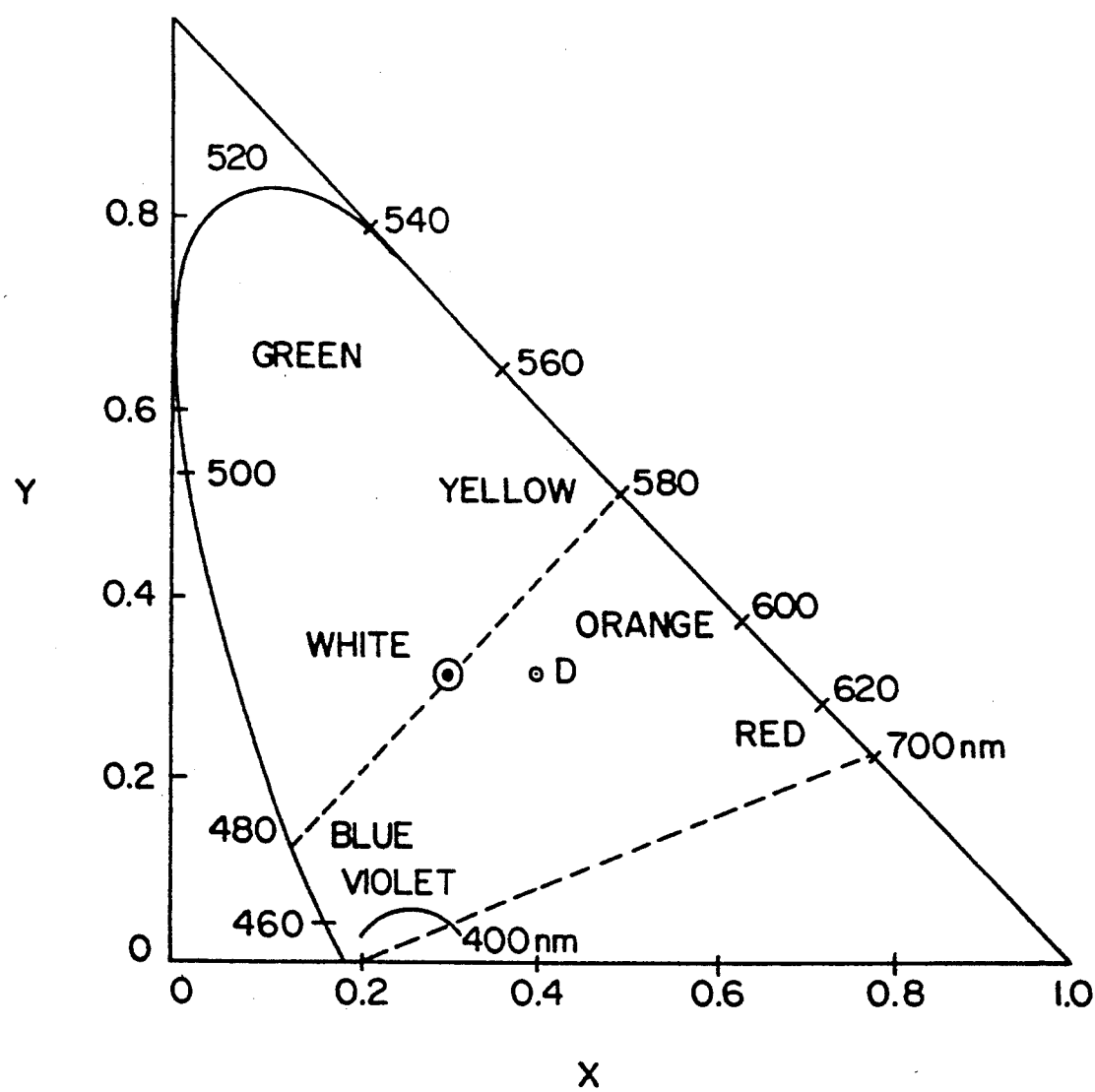

Color perception by the human eye is actually the result of the physical wavelength detection by the eye combined with interpretations of that detection by the brain. Color perception is often analyzed using a chromaticity diagram like the representative diagram provided as FIG. 5 In this diagram, the spectral colors are found along the curved line from violet at 400 nm to red at 700 nm. The diagram indicates a color space that can be accessed on mixing different amounts of the spectral colors. As suggested by the shape of the diagram, mixtures employing varying amounts of three spectral colors (preferably a red, green and blue and more preferably a saturated red, green and blue) will allow access to the widest range of colors. Specifically referring to the temporal mixing of the filters of the present invention, changing the duty cycle or the applied field shifts the color perceived by the observer, and a filter which switches rapidly between a red, green and blue output can be used to generate color mixtures which are linear combinations of those three colors.

Figure 6:
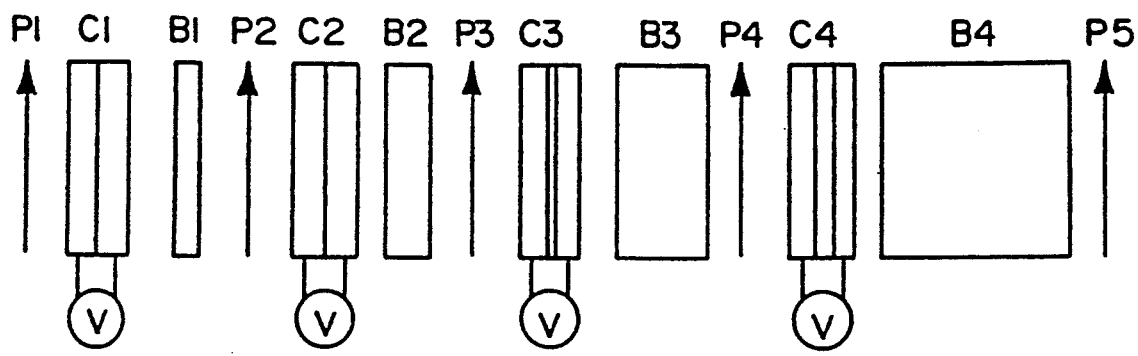
Figure 7A:
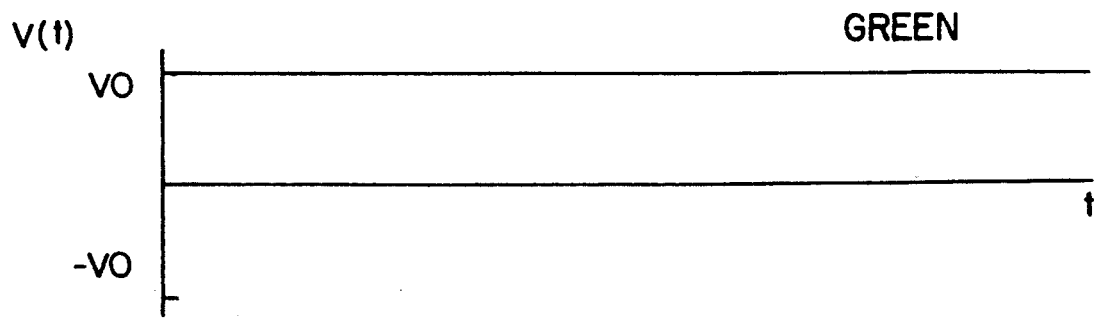
Figure 7B:
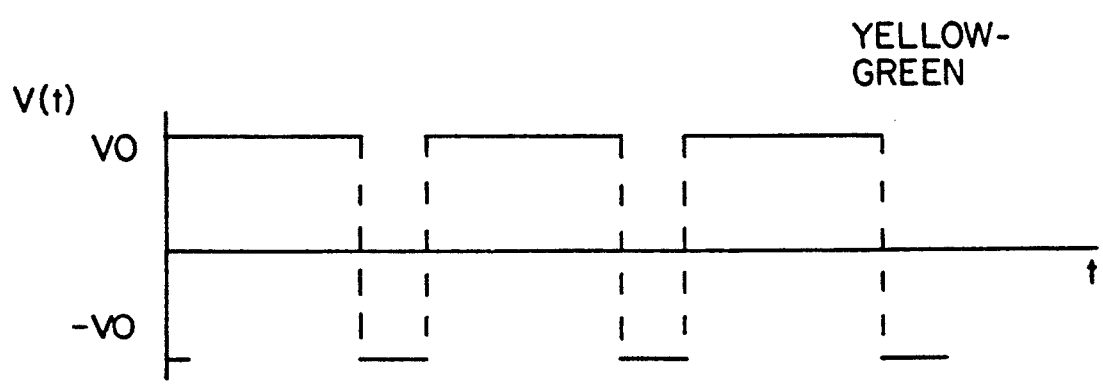
Figure 7C:
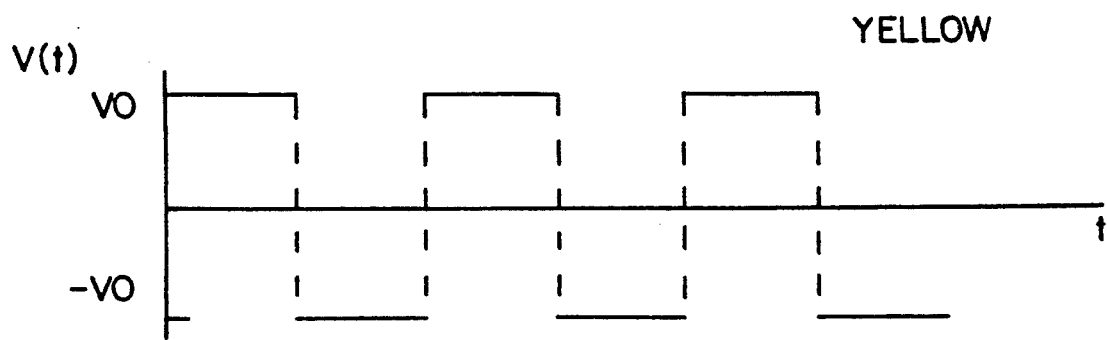
Figure 7D:
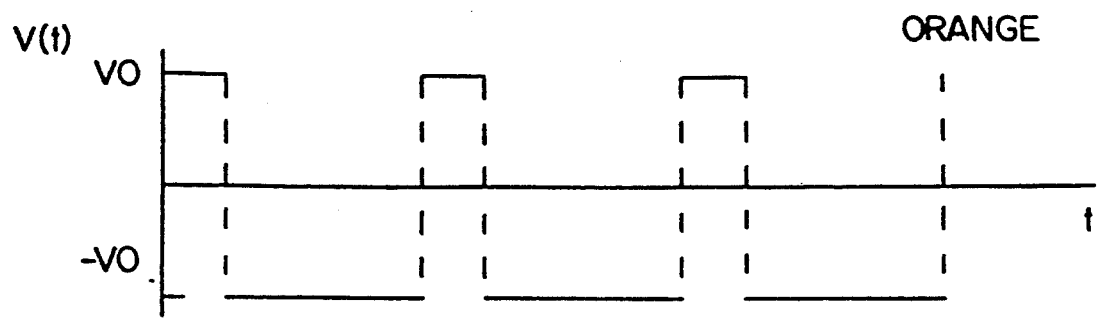
Figure 7E:
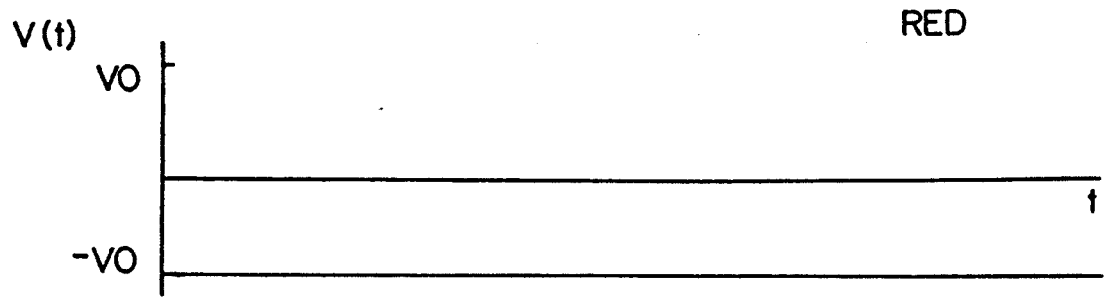

A multiple visible color generator employing Lyot-type filters with fast switching FLC cells is illustrated in FIG. 6. This four-stage filter was designed to switch rapidly between two wavelengths (green and red) to visually generate colors which are linear combinations of the design wavelengths. As seen by reference to the chromaticity diagram of FIG. 5, colors ranging from red, orange, yellow through green should be generable. The filter of FIG. 6 is a four-stage Lyot-type filter with thicknesses of birefringent elements (B1-B4) and SSFLC (C1-C4) increasing in the ratio of 1, 2, 4 and 8, for C1-C4, respectively, with parallel polarizers defining the stages. The polarizers employed were HN-22 dichroic sheet polarizers. Four birefringent elements which retard light at 540 nm by one, two, four and eight waves (B1, B2, B3 and B4 respectively) were placed between the polarizers (P1-P5). The fixed birefringent element in a stage is oriented at 45° with respect to the plane of polarization of light entering the stage. The SSFLC cells C1-C4 were constructed to have specific thicknesses 0.6 μm, 1.2 μm, 2.4 μm and 4.8 μm, respectively to retain the Lyot-structure. The use of FLC cells of varying thickness rather than multiple cells of the same thickness in different stages of the filter is preferred as the filter throughput is significantly increased and the cost and complexity of the filter is decreased. The resultant filter switches between red (switched) and green (unswitched).

The SSFLC cells of the filter of FIG. 6 were switched rapidly as illustrated in FIG. 7. Application of a −voltage (−Vo) switches the FLC cell; application of the +voltage (+Vo) switches the cells to the unswitched state (green). The light source used was a 280W tungsten lamp. The filter output was visually observed by a subject who was believed to have normal color vision. The various color outputs can also be detected photographically. FIG. 7 indicates the observed visible color output of the filter of FIG. 6 for various pulsing sequences (on cycles of on and off switching) of the SSFLC cells. The SSFLC cells in all stages were synchronously switched. For example, a voltage duty cycle which results in the filter being rapidly switched between red and green, where the time that the filter transmits red light is about equal to the time the filter transmits green light, generates a perceived yellow color. Variations in the duty cycle applied to the filter generate a continuous range of colors between red and green.

Incorporation of an additional FLC cell in each stage of a filter like that of FIG. 6 allows temporal switching between three colors (e.g. red, blue and green). Application of driving schemes to such a three color filter analogous to those used and illustrated with the two color filter (FIG. 7) results in a visible color generator which can access a broad area of perceived visible color space.

Figure 8:
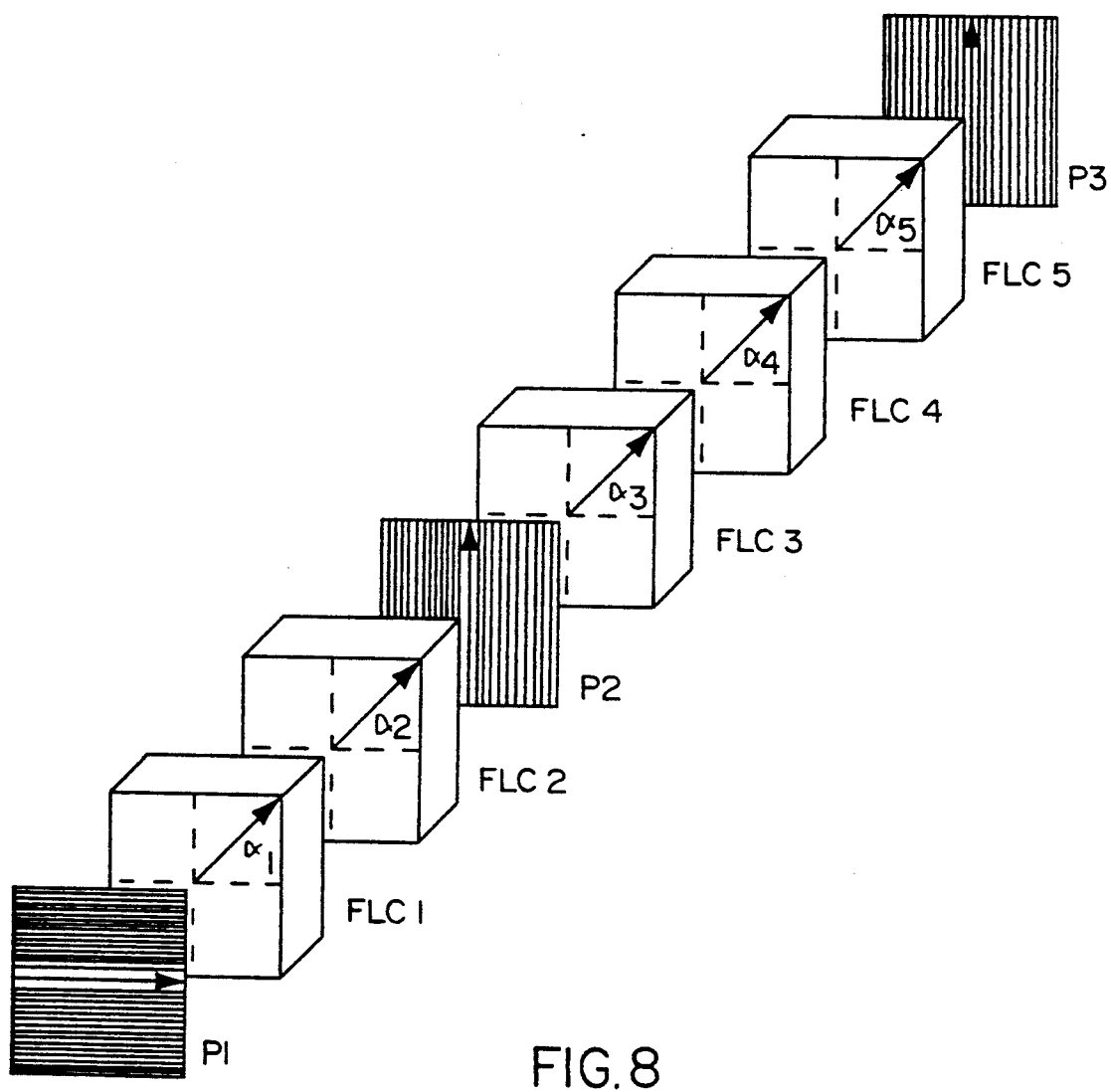

As a further implementation of the visible color generator employing rapidly switching FLC cells, the present invention also provides FLC cell color blocking filters. The two-stage blocking filter of FIG. 8 is designed to generate transmission output centered at 465 nm (blue), 530 nm (green) and 653 nm (red). The filter of FIG. 8 consists of three independent two-stage birefringent filter designs which are electronically selectable. For each output, the product of the transmission spectrum of each stage yields a narrow highly transmitted band centered at a chosen wavelength, here a primary color, with effective blocking of all other visible wavelengths. Preferably each stage should have a common maximum centered at a selected color (i.e., primary color here). For effective out of band rejection, additional maxima for a particular stage must coincide with minima of another stage. Each selected band to be transmitted (for example, each primary color band) is produced by switching at least one cell in each stage. Switching more than one FLC cell in a particular stage increases retardation, thus changing the transmission spectrum.

The blocking filter of FIG. 8 consists of two stages, one having crossed polarizers, the other between parallel polarizers. The filter contains five FLC cells, each with a selected thickness of liquid crystal, arranged between three polarizers (3 FLC's in one stage, 2 FLC's in the other stage). The arrows shown in FIG. 8 on each FLC cell, and the corresponding angles ($\alpha_1$-$\alpha_5$), represent the orientation of the optic axes with respect to the input polarizer. These angles can be either 0 or $\pi/4$. The transmission of the filter is the product of the transmission spectra of the individual stages. A stage with multiple independently switchable FLC cells can produce multiple transmission spectra. FIGS. 9a-9e show the experimentally measured outputs of each stage (solid line), along with a computer simulation of the filter output.

The first stage consists of two FLC cells between crossed polarizers. Switching neither of the cells ($\alpha_1$-

Figure 9A:
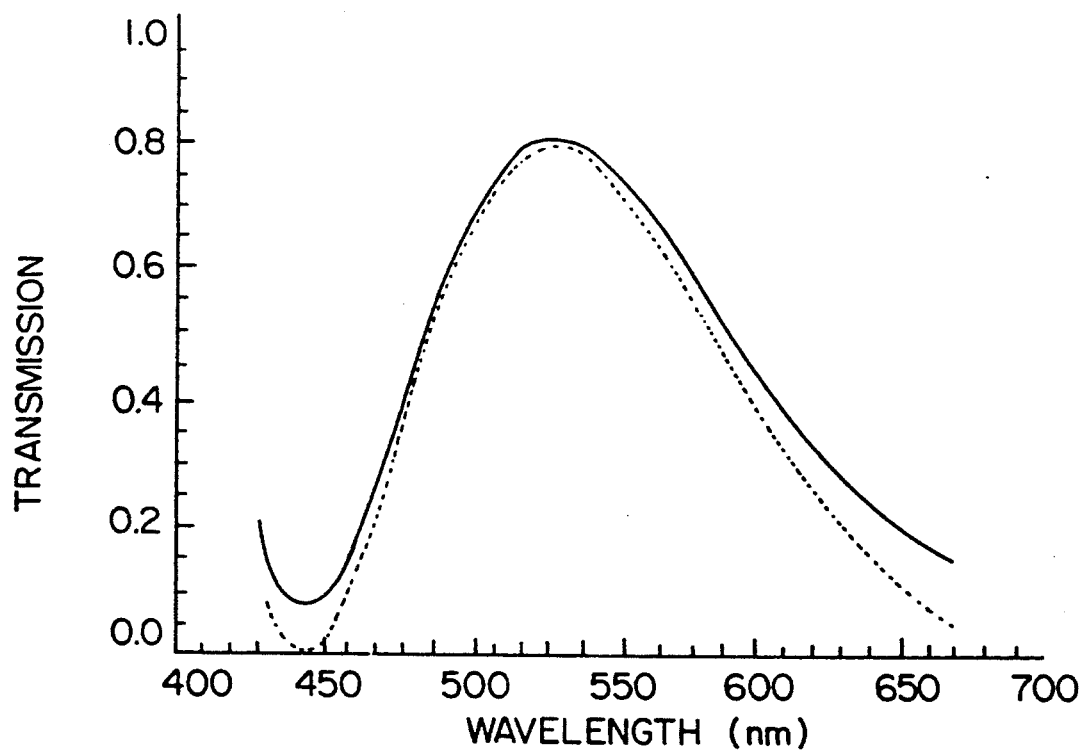
Figure 9B:
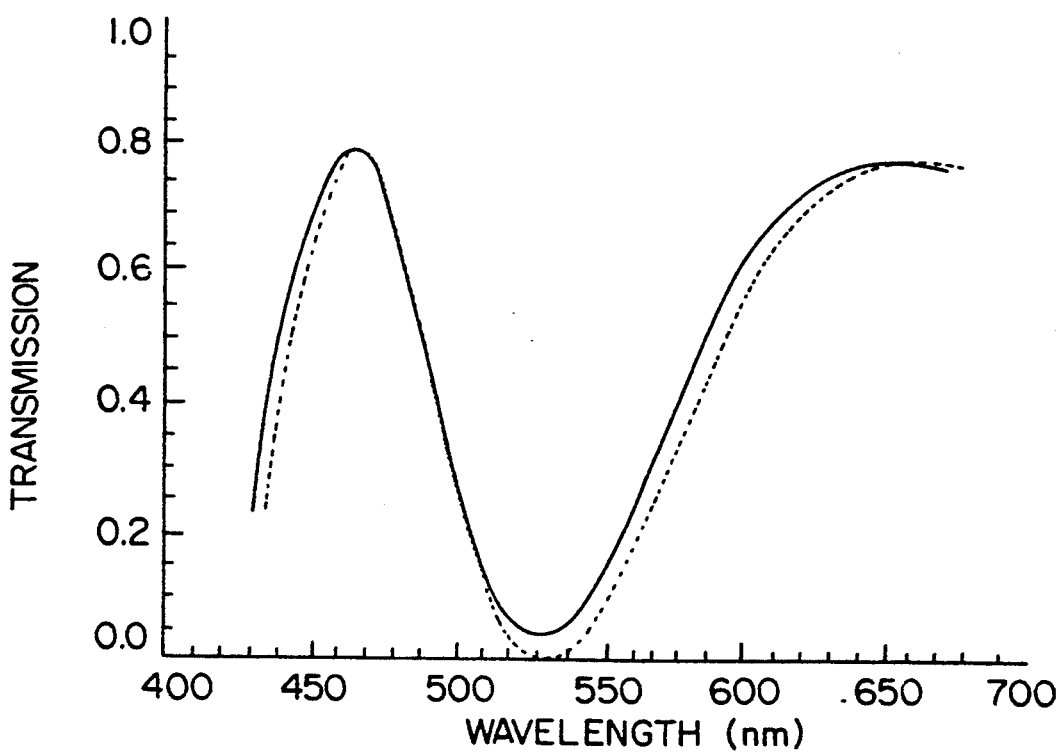
Figure 9C:
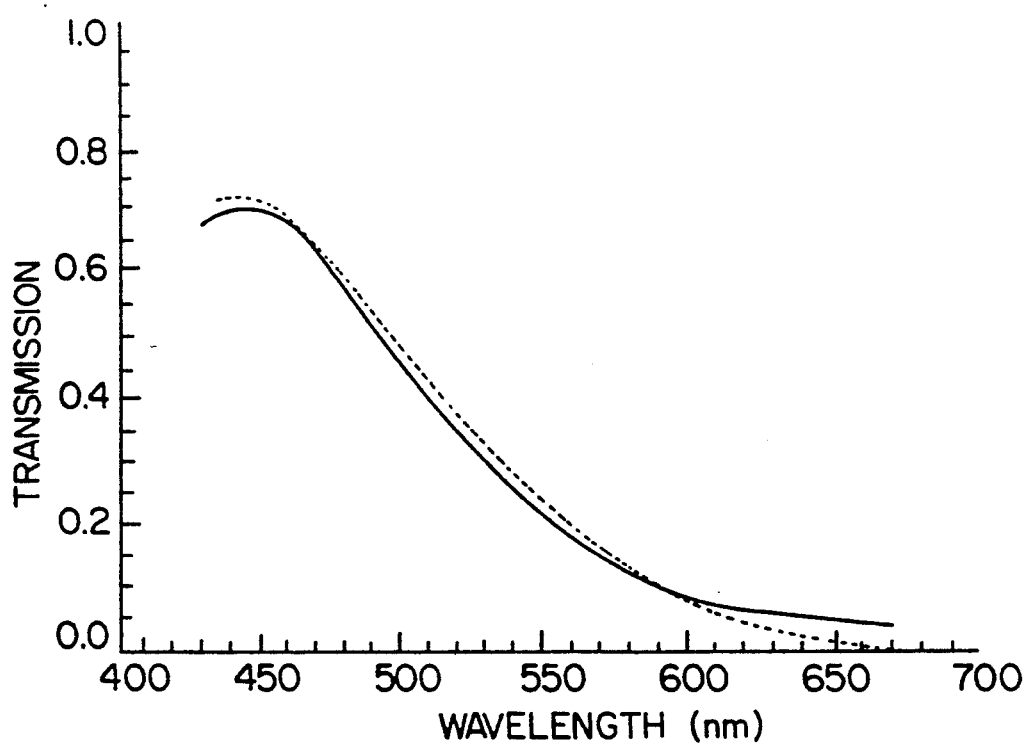
Figure 9D:
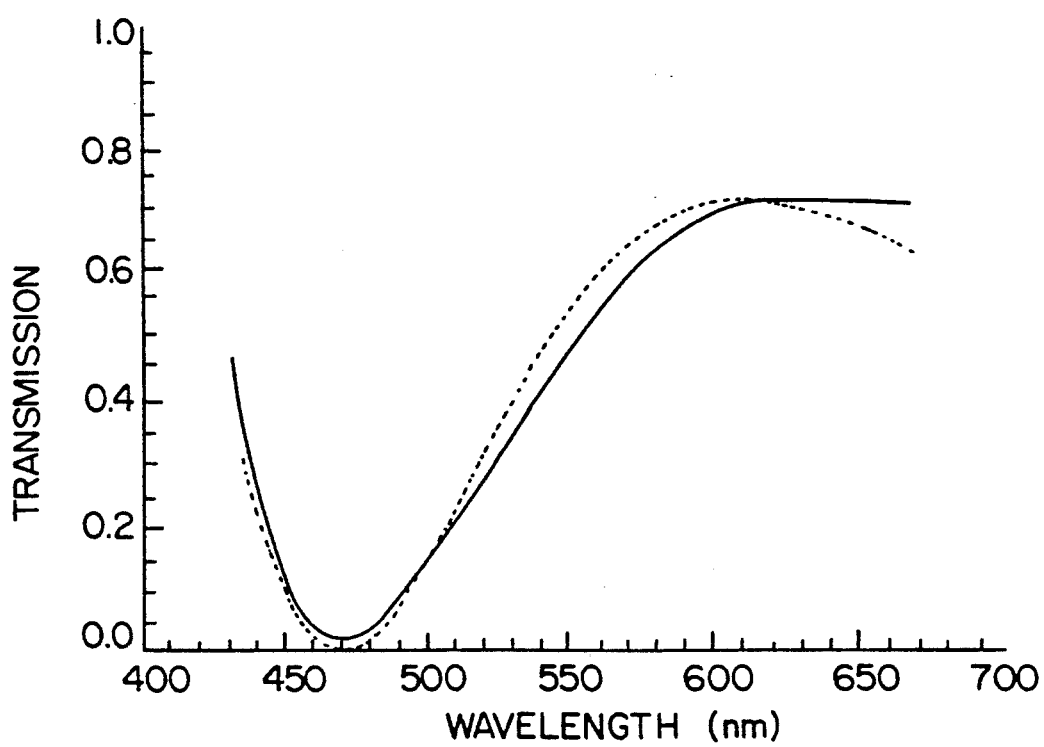
Figure 9E:
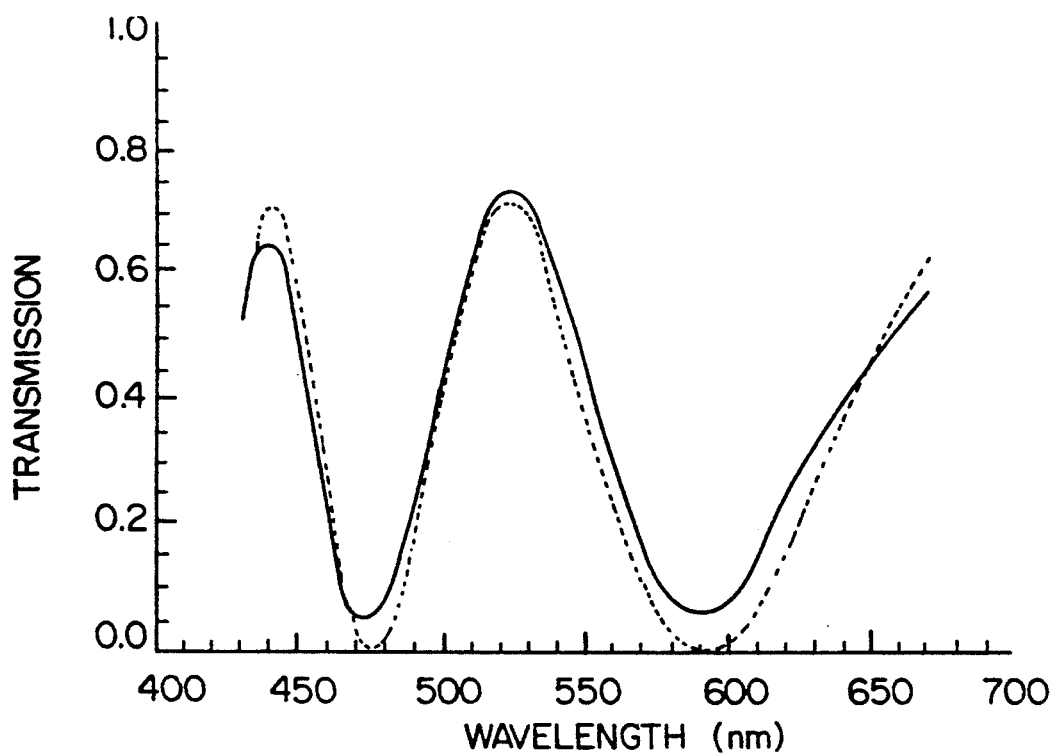

$=\alpha_2=\pi/4$), the output of FIG. 9a is produced. This is centered in the green (530 nm) and has minima at 446 nm and 715 nm. Switching cells 1 and 2 ($(\alpha_1=\alpha_2=\pi/4)$), produces the spectrum of FIG. 9b, which has maxima at 465 nm (blue) and 653 nm (red), with a minimum at 530 nm.

The second stage consists of three cells between parallel polarizers. With only cell 5 switched, the output of FIG. 9c results. This output has a maximum at 442 nm (blue) and a minimum at 700 nm. Switching all three cells produces the output of FIG. 9e, which has a narrow band centered at 530 nm. The function of the second stage is to narrow the green output (obtained with cell 1 switched), and to select between the blue or red outputs produced when FLC cells 1 and 2 are both switched. Switching cell 5 of the second stage blocks the red output of the first stage while transmitting blue output. Switching both cells 4 and 5 strongly transmits the red at 610 nm, while blocking blue output at 470 nm. Switching all three cells of the second stage narrows the green output ($\sim$530 nm) from the first stage.

The source spectrum can be transmitted by the filter by switching FLC cell 1 only. Cell 1 is a zero order half-waveplate over most of the visible. Therefore, when cell 1 is switched, the input polarization is rotated by $\pi/2$, aligning with the optic axis of cell 2 and the exit polarizer. Because the second stage is between parallel polarizers, none of cells 3–5 need be switched. A summary of switching requirements necessary to obtain all outputs is provided in Table 1.

Figure 10A:
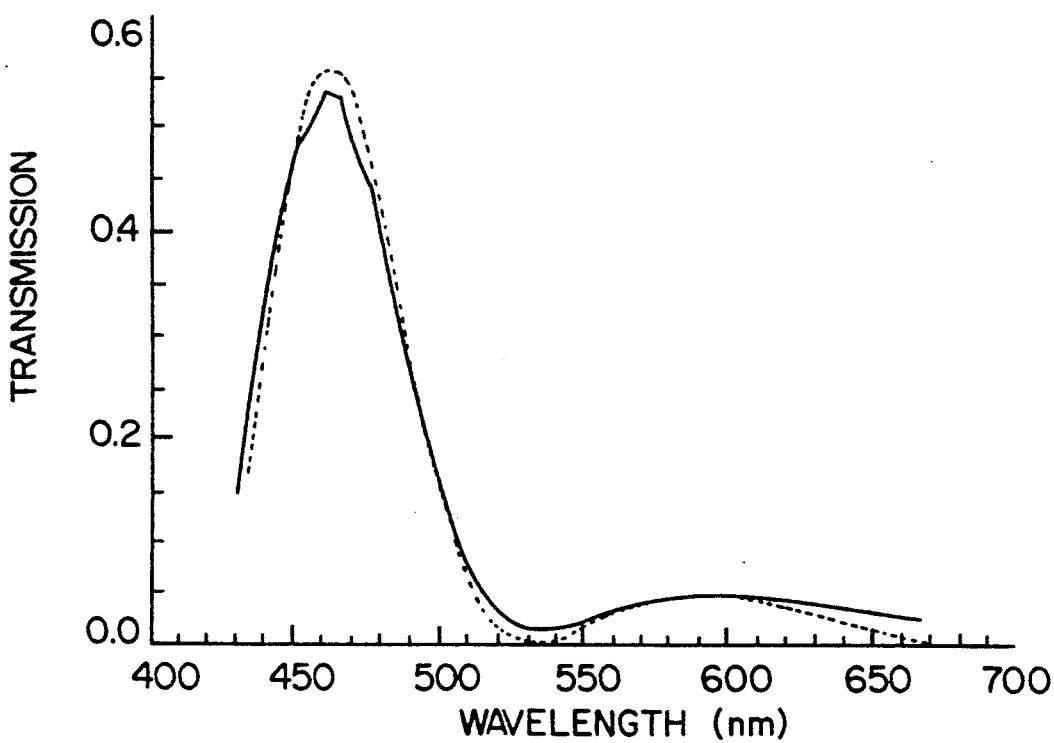
Figure 10B:
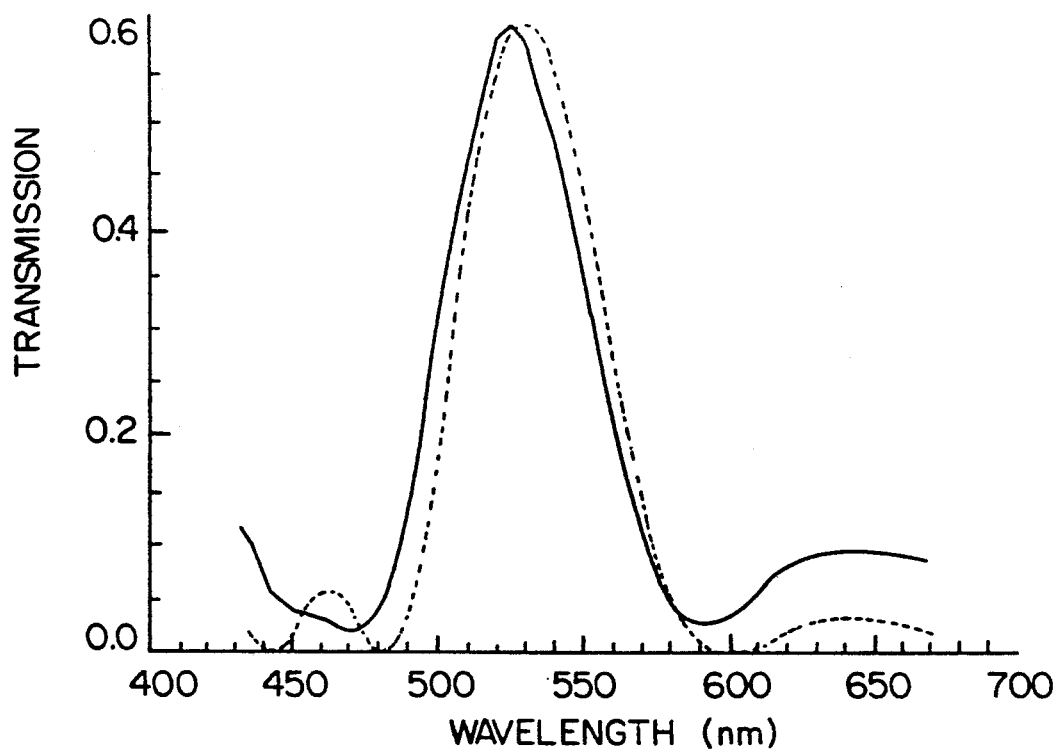
Figure 10C:
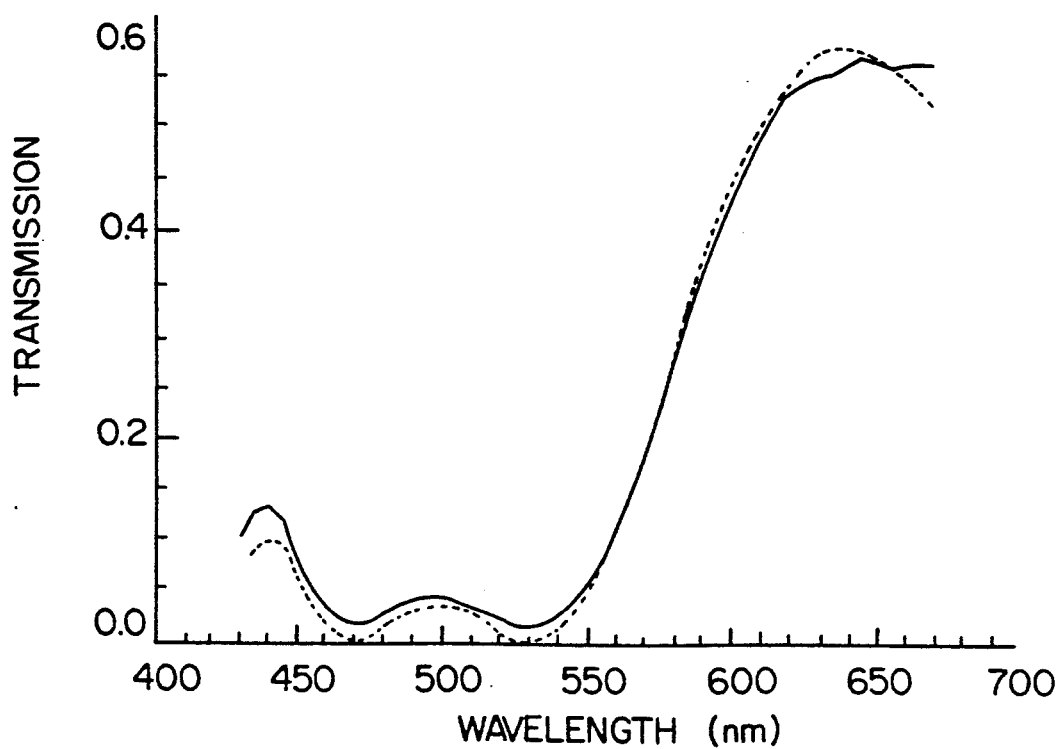

The experimental (solid line) and simulated (dotted line) transmission spectra for blue, green and red outputs are shown in FIGS. 10a–c, respectively. The FLC cell thicknesses of FLC's 1–5 are; 1.8 $\mu$m, 5.2 $\mu$m, 2.6 $\mu$m, 1.7 $\mu$m, and 6.1 $\mu$m, respectively. The FLC cells were designed and assembled at the University of Colorado at Boulder. Accurate measurement of cell thickness was obtained by relating the capacitance of the unfilled cell to the resulting retardation spectrum after filing The cell substrates employed were two $\lambda/10$ optical flats, each having one side coated with an ITO transparent electrode. The alignment layer employed was an oblique vacuum deposited layer of SiO. FLC cells were first individually analyzed between parallel polarizers to determine optical thickness uniformly and alignment quality. Typically, the transmission of a single cell without AR coating is 90%. By using HN42HE dichroic polarizers, cementing the cells in each stage together with index matching epoxy and AR coating exterior surfaces, the filter was found to transmit 50% of incident polarized light. The experimental results were obtained using a 0.5 m SPEX grating spectrometer system. The source employed was a tungsten filament which transmits light through a diffuser and collimating optics.

Table 1 provides a summary of FLC switching combinations for the filter of FIG. 8 required to obtain indicated transmission outputs (red, green, blue, black (no transmission) and white (source transmission).

TABLE 1

Summary of Switching Requirements For the FLC Blocking Filter of FIG. 8.

| OUTPUT | $\alpha_1$ | $\alpha_2$ | $\alpha_3$ | $\alpha_4$ | $\alpha_5$ |
|---|---|---|---|---|---|
| WHITE | $\pi/4$ | 0 | 0 | 0 | 0 |
| BLUE | $\pi/4$ | $\pi/4$ | 0 | 0 | $\pi/4$ |
| GREEN | 0 | $\pi/4$ | $\pi/4$ | $\pi/4$ | $\pi/4$ |
| RED | $\pi/4$ | $\pi/4$ | 0 | $\pi/4$ | $\pi/4$ |
| BLACK | 0 | 0 | — | — | — |

The blocking filters described herein have been described specifically for use with an apparently white light source. They have been designed particularly to produce selected wavelength transmission in the visible spectrum. It will be clear to those of ordinary skill in the art that sources other than white light can be employed with FLC blocking filters and that wavelength regions other than the visible region can be accessed. The modifications in FLC thickness, choice of materials, source light, etc. required to employ FLC filters for different light sources and in different wavelength region can be readily made by those of ordinary skill in the art.

Figure 11:
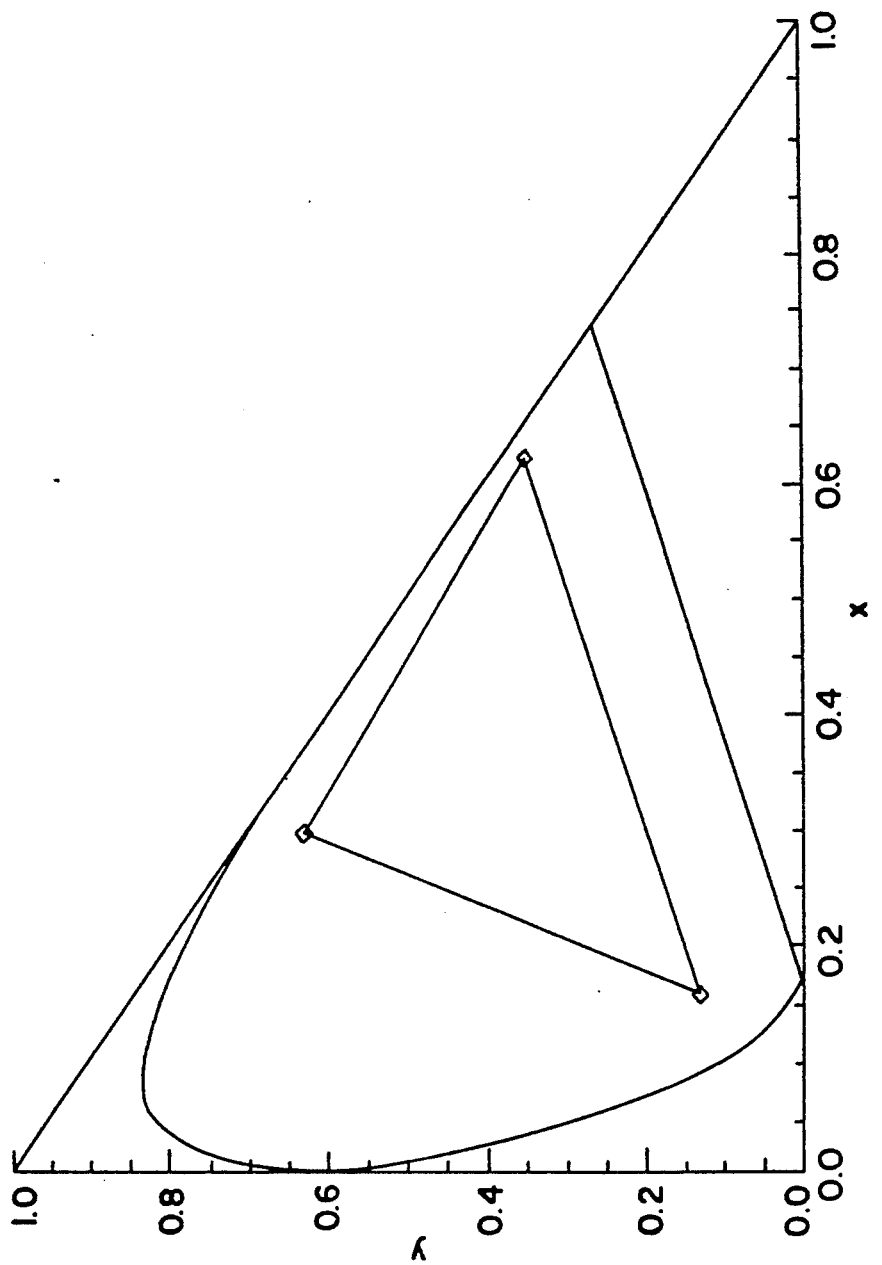

In blocking filters, the thickness of the FLC cells and the relative orientations of the polarizer elements are selected to optimize transmission of desired wavelengths in the blocking filter and minimize transmission of undesired wavelengths. FLC cells with the required thickness and optical transmission properties for a particular color generation application can be readily fabricated using techniques known to the art. The color blocking filters, like that of FIG. 8 can be readily adapted for temporal color mixing as described for the Lyot-type filters above. Application of an appropriate voltage duty cycle scheme to switch the desired pairs of FLC cells can generate a range of perceived colors (color space), as shown in FIG. 11 which provides the chromaticity diagram for the red, blue and green spectra produced by the filter of FIG. 8.

In addition a blocking filter can be designed to transmit the source light (most often white) with no wavelength effect in one switched configuration state, and transmit no light in another switched state (black) FLC pulsing schemes of such a filter can include switching to white and black to allow more flexible selection of generated colors. Blocking filters switching between two selected wavelengths or more than three selected wavelengths can be implemented by appropriate selection of FLC cells (thickness) and positioning and orientation of polarizers. Additional spectral purity of transmitted color (i.e., narrower band width) can be achieved while retaining blocking of unwanted colors by increasing the number of stages in the filter with appropriately selected FLC cells in the stages.

Figure 12:
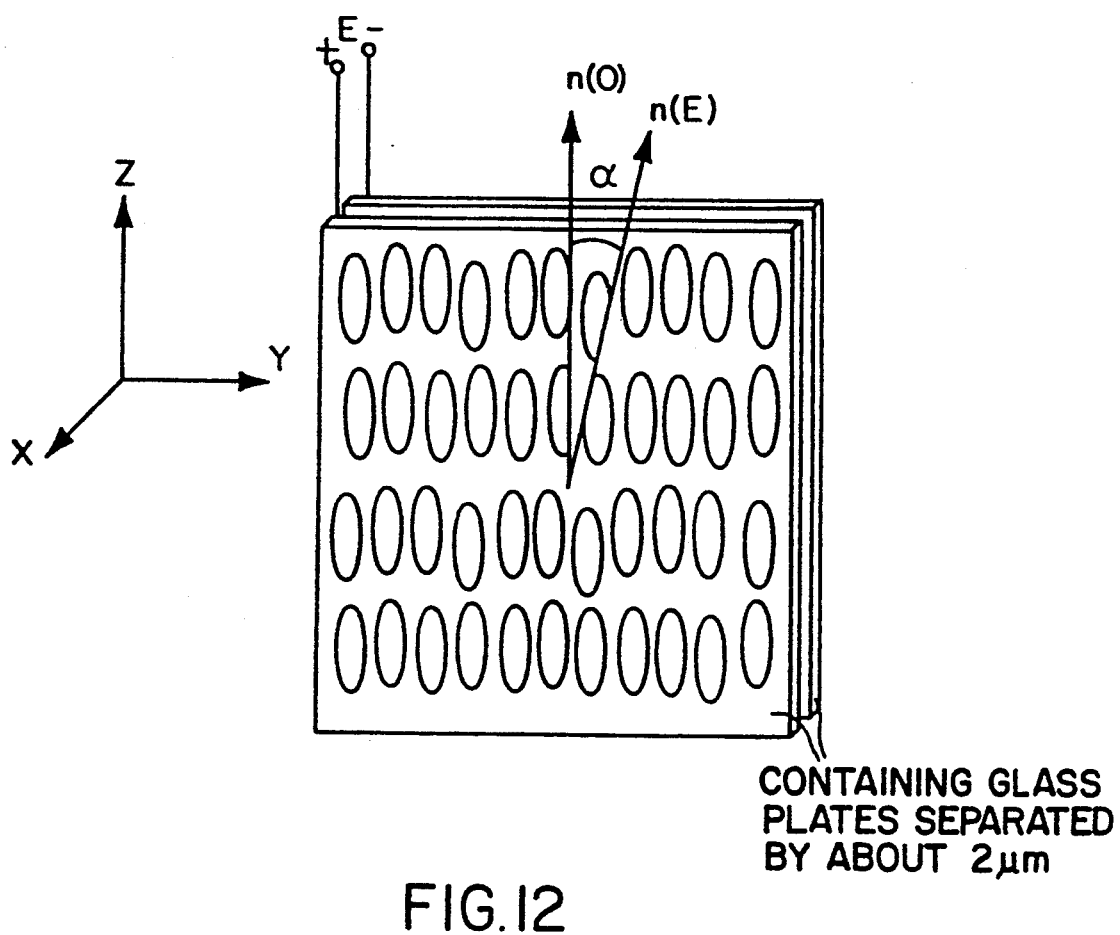

The present invention also provides continuously tunable filters which do not require temporal multiplexing and are not limited to use with slow response detectors or to use in the visible spectrum. These filters utilize analog CSLC cells, for example chiral smectic A (SmA*) liquid crystal cells and DHF liquid crystal cells. The physics and operation of the surface stabilized SmA* device has been described elsewhere (Andersson et al. (1987) Appl. Phys. Lett. 51:640). In a smectic A* liquid crystal cell, illustrated in FIG. 12, the optic axis tilt as an approximately linear function of applied voltage. Placed between polarizers, the device acts like an analog intensity modulator. Recently described DHF cells will function similarly to the smectic A* cells in continuously tunable filter configurations of the present invention. The achievable maximum tilt angles of known DHF materials ($\pm 38°$) are significantly larger than those of smectic A* materials. DHF cells thus will allow wavelength tuning over wide ranges.

Figure 13:
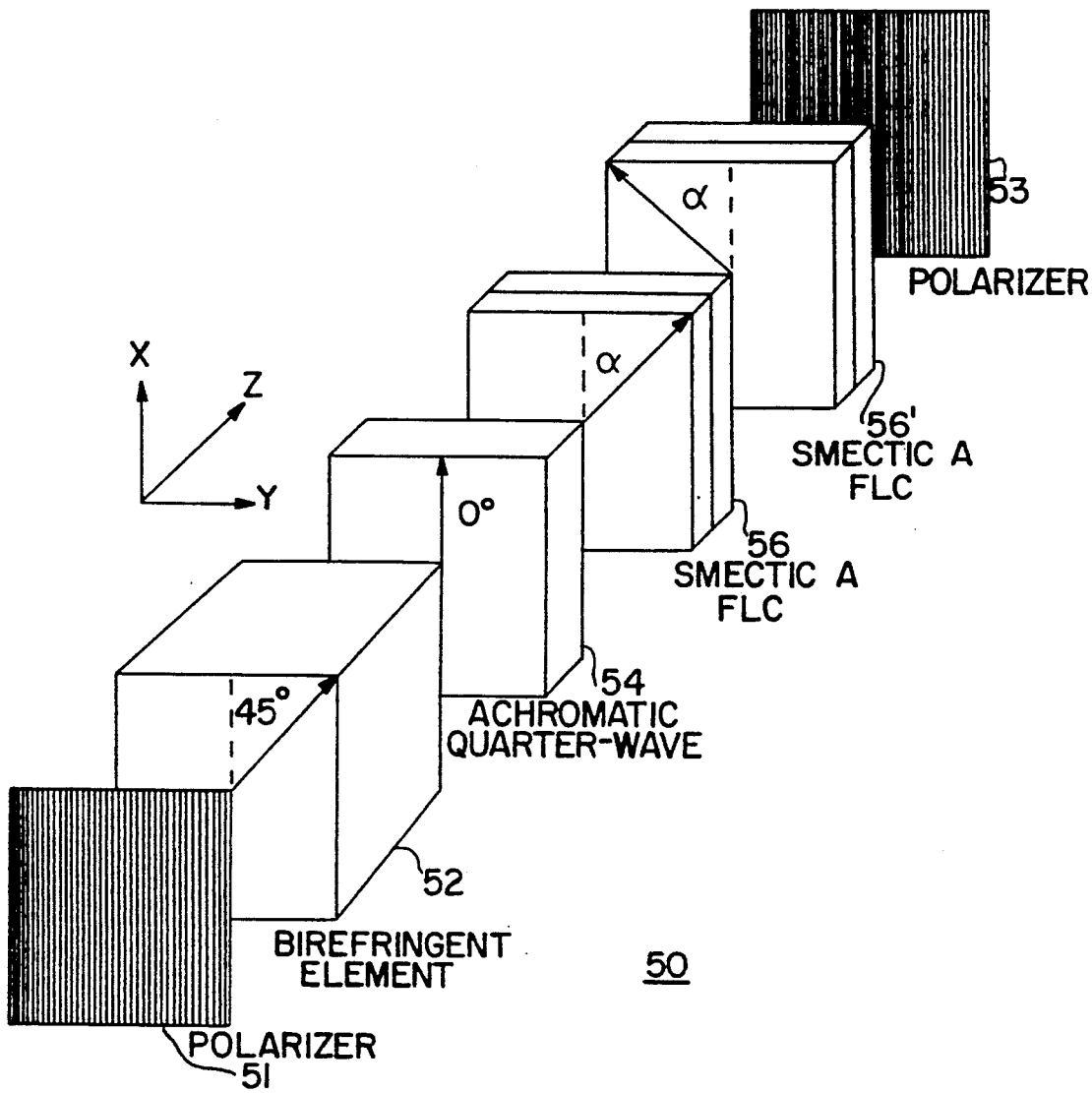

FIG. 13 illustrates the operation of the analog CSLC tunable filter. The direction of propagation of light is along the z axis, the faces of the birefringent element and the CSLC's are normal to the z axis, with polarizers oriented along the x axis. Since the optic axis of the fixed birefringent element is oriented by 45° with respect to the x axis, the input is divided into two equal amplitude waves, which travel at different phase velocities through the material. The retardation between the two waves at the exit of the birefringent element is given by $$\Gamma(\lambda) = 2\pi \Delta n d / \lambda \quad (11)$$

where $\Delta n$ is the birefringence of the material, d is the material thickness and ($\lambda$) is the free space wavelength.

In general, the polarization of broad-band light exiting the birefringent element is elliptical, with field components parallel and perpendicular to the direction of the input polarization. Denoting these field amplitudes, $E_x$ and $E_y$, respectively, the ellipticity ($E_y/E_x$) is a function of wavelength. The field exiting the birefringent element is incident on the achromatic quarter-waveplate, which functions as an ellipticity analyzer (Title, A. M. and W. J. Rosenberg (1981) Opt. Eng. 20:815). This element gives a retardation of $\pi/2$, independent of wavelength, bringing the quadrature field components into phase. Therefore, the achromatic quarter-waveplate converts elliptical polarizations into linear polarizations with wavelength dependent orientation. The amplitudes of the field components are $E_x(\lambda) = \cos[\Gamma(\lambda)/2]$ and $E_y(\lambda) = \sin[\Gamma(\lambda)/2]$, respectively, where $\Gamma(\lambda)$ is given by Equation 11. Since these two components are in phase, this represents a linearly polarized field oriented at an angle, $\Gamma(\lambda)/2$. Tuning is therefore accomplished by simply following the achromatic quarter-waveplate with a rotatable exit polarizer, which selects the desired wavelength. In a multiple state filter this would require rotating every element in subsequent stages, in order to maintain the desired filter geometry Furthermore, this approach requires mechanical rotation to achieve tuning, which is relatively slow.

A simpler approach that has been described is to introduce a rotatable achromatic half-waveplate (giving a constant phase delay of $\pi$ for all wavelengths) into each stage of the filter (Title and Rosenberg, supra). A half-waveplate, oriented at an angle $\phi$ to a linearly polarized input, simply reflects the linear polarization about the fast axis of the crystal, giving a rotation of $2\phi$. Therefore, a rotatable half-waveplate can be oriented so as to reflect the desired wavelength to the direction of the exit polarizer. A similar tunable filter can be achieved using the fast response SmA* or DHF liquid crystal cells.

The transmission spectrum of the tunable color filter, as illustrated in FIG. 13, can be determined using Jones calculus (Jones, R. C. (1941) J. Opt. Soc. Am. 31:488). The output of the filter can be represented by the matrix equation $$E'(\lambda) = P_x W(\lambda) A B(\lambda) P_x E(\lambda) \quad (12)$$

where $E(\lambda)$ and $E'(\lambda)$ are the column vectors giving the x and y components of the input and transmitted electric fields, respectively, and $P_x$ and $B(\lambda)$ are the matrices representing the polarizers oriented along the x axis and the fixed birefringent element with optic axis oriented at 45° to the x axis, respectively. These matrices are given by Yariv, A. and P. Yeh (1984) Optical Waves in Crystals, Chapter 5, John Wiley and Sons, New York:

$$P_x = \begin{vmatrix} 1 & 0 \\ 0 & 0 \end{vmatrix}, B(\lambda) = \begin{vmatrix} \cos[\Gamma(\lambda)/2] & -i\sin[\Gamma(\lambda)/2] \\ -i\sin[\Gamma(\lambda)/2] & \cos[\Gamma(\lambda)/2] \end{vmatrix} \quad (13a, b)$$

where the retardation $\Gamma(\lambda) = 4\pi \lambda_d / \lambda$, and $\lambda_d (= \Delta n d)$ is the design wavelength of the filter in the absence of tuning elements. This is the wavelength at which the birefringent element functions as a $2\lambda$ plate. Negligible dispersion of the fixed birefringent elements is assumed throughout the tuning range. The matrices $$A = \begin{vmatrix} e^{-i\pi/4} & 0 \\ 0 & e^{i\pi/4} \end{vmatrix} \quad (14a)$$

and $$W(\lambda) = \begin{vmatrix} \cos[\Gamma_L(\lambda)/2] - i\cos[2\phi]\sin[\Gamma_L(\lambda)/2] & -i\sin[2\phi]\sin[\Gamma_L(\lambda)/2] \\ -i\sin[2\phi]\sin[\Gamma_L(\lambda)/2] & \cos[\Gamma(\lambda)/2] + i\cos[2\phi]\sin[\Gamma_L(\lambda)/2] \end{vmatrix} \quad (14b)$$

represent the achromatic $\lambda/4$ plate and $\lambda/2$ plate, respectively. In these expressions, $\phi$ is the electronically controlled tilt of the waveplate and $\Gamma_L(\lambda)$ is the retardation of the FLC cell, given by $$\Gamma_L(\lambda) = \pi \frac{\Delta n(\lambda) \lambda_d}{\Delta n(\lambda_d) \lambda} \quad (15)$$

This expression includes the effect of dispersion of the FLC birefringence, $\Delta n(\lambda)$. To simplify the analysis, it is assumed that the FLC cells function as perfectly achromatic half-waveplates. However, the computer model takes into account the non-achromatic nature of the FLC's. Assuming perfect achromaticity, Equation 14 can be rewritten as $$W(\lambda) = \begin{vmatrix} -\cos[2\phi] & -\sin[2\phi] \\ -\sin[2\phi] & \cos[2\phi] \end{vmatrix} \quad (16)$$

Substituting the matrices into Equation 2, and using the relation $T(\lambda) = |E'_x(\lambda)/E_x(\lambda)|_2$, yields the continuous CSLC-based filter intensity transmittance $$T(\lambda) = \cos^2[\Gamma(\lambda)/2 - 2\phi]. \quad (17)$$

Equation 17 gives the selected wavelength $\lambda = \lambda_d/[1 + \phi/\pi]$, as a function of angle of the half-waveplate. The net tilt angle that can be obtained can be increased by cascading several SmA* LC cells. The LC cells are positioned within the filter such that the direction of rotation of the optic axis of the cells alternates in sign along the light path through the filter. Two half-waveplates provide a pure rotation of twice the angle between their axes. For example, two SmA* LC cells having $a_{MAX}$ of 12° which tilt in opposite directions can provide a maximum net rotation of light polarization of 48°.

A single stage continuously tunable filter is illustrated in FIG. 13. The input and exit polarizers for the stage are P1 and P2. A birefringent element (B), which retards light at 540 nm by two waves was used as the fixed birefringent element. SmA* cells were fabricated to be half-waveplates at 540 nm within ±2 nm. Two SmA* LC cells (maximum tilt angle of 12° each) were cascaded in this filter to increase the maximum tilt angle and expand the tuning bandwidth.

The optic axes of the SmA* cells were rotated using a single HP 6299A DC power supply and temperature controlled to 29±0.2° C. This temperature is 1° C. above the C*-A* transition for SmA* BDH764E electroclinic material used in these experiments (BDH-764E mixture available from EM Industries Inc., 5 Skyline Drive, Hawthorne, N.Y.), maximizing $\phi$. The light source used was an Oriel model 68735 tungsten lamp. The filter output was analyzed with a monochrometer with ±1 nm resolution and a Newport 820 power meter.

Figure 14A:
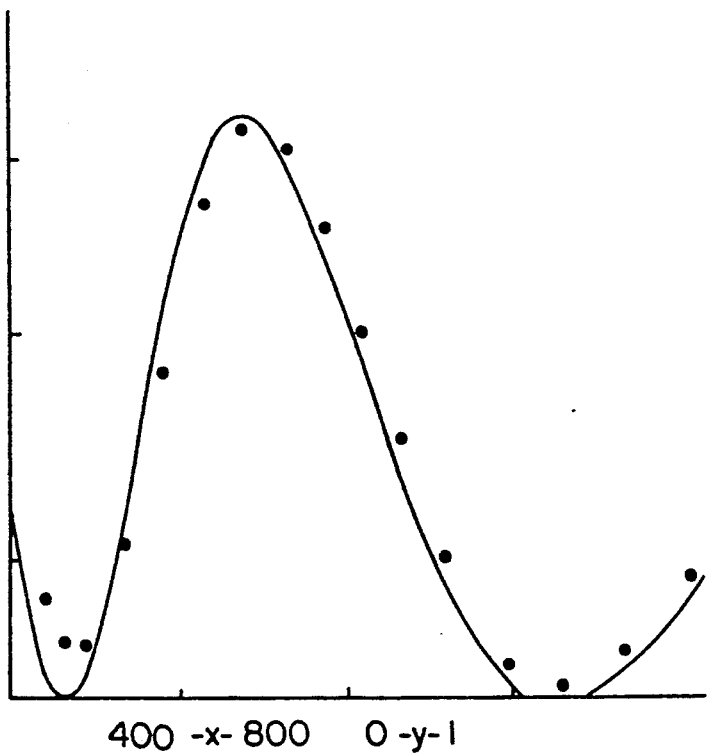
Figure 14B:
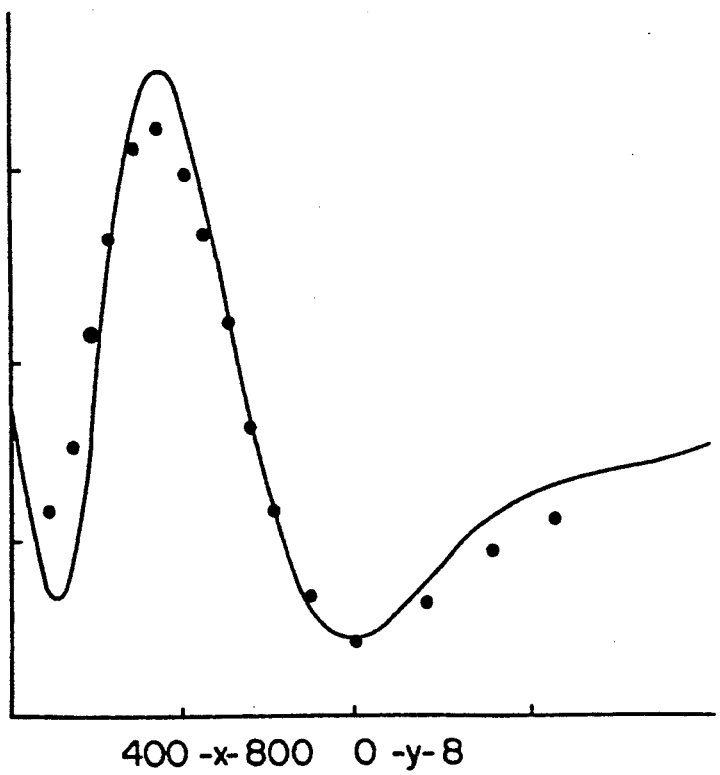
Figure 14C:
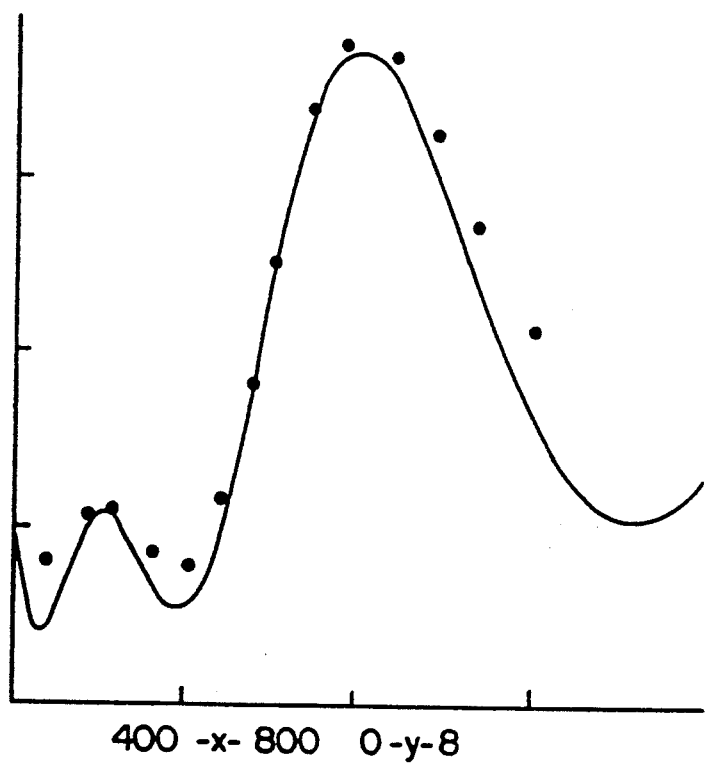

The experimental results are plotted in FIG. 14 $a$–$c$ (points) along with computer simulations (solid lines). FIG. 14$a$ is the transmission with no field applied, i.e., the design wavelength 540 nm. FIG. 14$b$ is the transmission spectrum for a maximum tilt of +24.0°, i.e., a selected wavelength of 476 nm. FIG. 14$c$ is the transmission spectrum for a maximum tilt of −24.0°, i.e., a selected wavelength of 623 nm. The experimental tuning bandwidth of this filter is about 115 nm. The filter can access any wavelength within this band by appropriate variation of the applied electric field.

The computer model used to calculate the filter output consists of a Jones matrix analysis, which takes into account the non-achromatic nature of the LC half-waveplates using a modified version of the Clausius-Mossotti equation of molecular polarizability (Wu, S. (1986) Phys. Rev. A. 33:1270). parameters required for this model were obtained by analyzing the transmission characteristics of FLC cells between parallel polarizers. Results of the model and experiment agree quite well. The discrepancy between the experimental bandwidth (115 nm) and that predicted in the ideal case (147 nm) is due to the chromaticity of the $\lambda/2$ plates.

Figure 15:
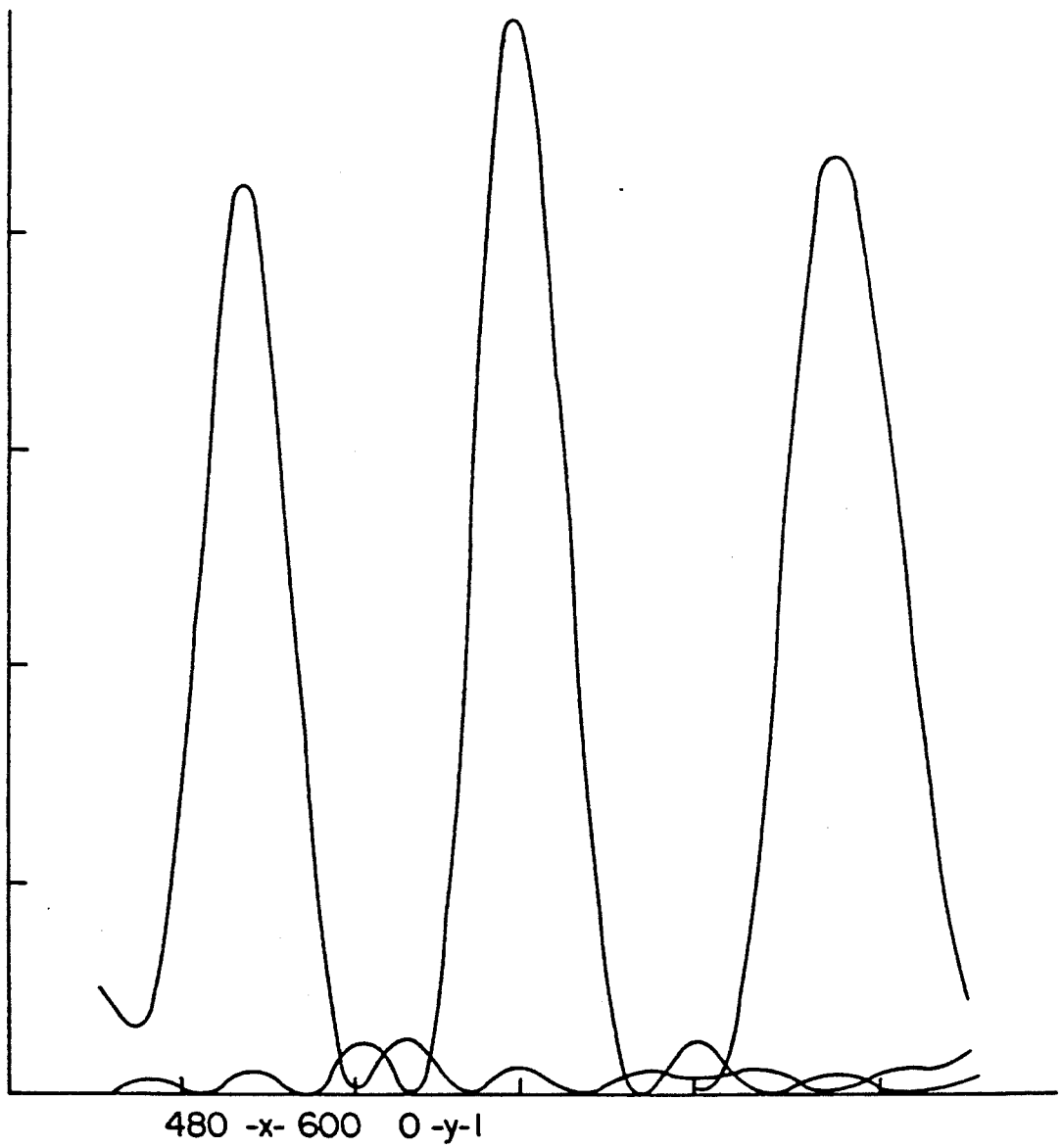

The computer model was used to calculate the transmission spectrum of a three-stage Lyot-type filter incorporating continuously tunable stages. The multiple-stage filter provides higher spectral resolution with broad and rapid tunability. Results of this simulation are shown in FIG. 15. The simulated filter has a design wavelength of 540 nm and incorporates two FLC cells in the first stage, each having a maximum tilt angle of 12.0°, allowing a tuning range of 70 nm, with a FWHM of 10 nm. FIG. 15 shows the superposition of three spectra: the design wavelength, the shortest attainable wavelength, and the longest attainable wavelength. The filter can address any wavelength within this band.

The achromatic quarter-waveplate combined with the analog CSLC half-waveplate(s) preceding the polarizer in the continuously tunable filters of this invention functions as a variable retarder. This structure is useful in other applications and most generally when the half-waveplate is not followed by a polarizer a second achromatic quarter-waveplate must follow the half-waveplate to complete the variable retarder.

As noted above, an electroclinic effect has been demonstrated in SSFLC-type cells incorporating short pitch liquid crystal materials, distorted helix ferroelectrics. Currently known DHF materials display maximum tilt angles of about ±38°. DHF electroclinic effect cells have been described, for example, in Beresnev et al. EPO Patent Application 309,774 (published Apr. 5, 1989). Such DHF cells can be employed in place of or in combination with smectic A* FLC cells in the continuous filter configurations described herein.

Continuously tunable filter stages can be combined to produce multistage filters in which, for example, enhanced wavelength resolution can be achieved. Design constraints are as described above for multiple-stage discretely tunable filters. The thicknesses of the birefringent elements (both fixed and variable) within a stage must vary in the same ratio from stage to stage. The exit polarizer of the preceding stage defines the plane of polarization of the light entering the next stage. Unlike discrete birefringent filters of this invention, an achromatic quarter-waveplate is positioned between the fixed element and the FLC cell in the continuously tunable cell. The fixed birefringent element of the continuously tunable cell can also be substituted with a smectic C* FLC cell ($2\alpha=45°$).

Currently, the tunability of the continuously tunable filters described herein above is limited by the maximum tilt angles of two LC cells (oppositely switched). The fundamental tuning range is limited by the spectral region over which the FLC cells function as half-waveplates. The continuously tunable FLCTF has potential advantages over other tunable filters with respect to switching voltages, power consumption, entrance aperture, field-of-view and switching speeds.

The present invention has been illustrated by the presentation of a number of specific embodiments. It is not intended that the scope of the invention be limited to those embodiments and devices specifically described.

We claim:

1. A tunable optical filter comprising one or more stages optically coupled in sequence wherein a stage comprises an entrance polarizer which defines the polarization of light entering the stage and an exit polarizer which is oriented at a fixed angle with respect to the entrance polarizer, wherein at least one stage of said filter comprises a fixed birefringent element optically coupled with a chiral smectic liquid crystal cell between said polarizers, said chiral smectic liquid crystal cell having two or more optic axis orientations, and electric field production means electromagnetically coupled with said chiral smectic liquid crystal cell for rotating the optic axis of said cell among said optic axis orientations to tune the spectral filtering of said light entering the stage.

2. The tunable optical filter of claim 1 wherein said filter comprises two or more stages.

3. The tunable optical filter of claim 1 wherein each of said stages comprises a fixed birefringent element.

4. The tunable optical filter of claim 1 wherein each of said stages comprises at least one chiral smectic ferroelectric liquid crystal cell.

5. The tunable optical filter of claim 1 wherein said chiral smectic liquid crystal cell has exactly two stable optic axis orientations.

6. The tunable optical filter of claim 5 wherein said chiral smectic liquid crystal cell is a bistable SSFLC cell.

7. The tunable optical filter of claim 1 wherein said entrance and exit polarizers are oriented at 0° or 90° with respect to one another.

8. The tunable optical filter of claim 1 wherein said fixed birefringent element within a stage is oriented at an angle of ±45° with respect to the direction of polarization of light entering that stage.

9. The tunable optical filter of claim 1 wherein at least one stage comprises two or more chiral smectic liquid crystal cells.

10. The tunable optical filter of claim 1 wherein said chiral smectic liquid crystal cell is a ferroelectric liquid crystal cell.

11. The tunable optical filter of claim 1 which contains two or more chiral smectic liquid crystal cells and wherein said optic axes of said cells are independently rotatable among said optic axis orientations.

12. The tunable optical filter of claim 1 which contains two or more chiral smectic liquid crystal cells and wherein said optic axes of said cells are synchronously rotatable among said optic axis orientations.

13. The tunable optical filter of claim 1 wherein the chiral smectic liquid crystal cell within a stage is oriented such that one of the optic axis orientations of the cell is at 0°, ±45° or 90° with respect to the polarization of light entering that stage.

14. The tunable optical filter of claim 1 wherein in said chiral smectic liquid crystal cell two of said optic axis orientations of said cell are separated from each other by an angle of ±45°.

15. The tunable optical filter of claim 1 wherein said chiral smectic liquid crystal cell is an analog chiral smectic liquid crystal cell the optic axis of which can be continuously rotated between $\pm\alpha_{MAX}$ of the cell.

16. The tunable optical filter of claim 15 wherein said analog chiral smectic liquid crystal cell is a chiral smectic A electroclinic cell or a distorted helix ferroelectric cell.

17. The tunable filter of claim 1 which comprises two or more stages and wherein the ratios of thicknesses of any of the chiral smectic liquid crystal cells and fixed birefringent elements to the thicknesses of any other chiral smectic liquid crystal cell or birefringent element within a stage are the same in all stages of the filter.

18. The tunable filter of claim 2 which has a Lyot-type geometry wherein the thicknesses of the chiral smectic liquid crystal cells and birefringent elements in the stages of said filter increase in a geometric progression: $2^0, 2^1, 2^2, \ldots, 2^{S-1}$ where S is the number of stages in the filter wherein the thicknesses of the cells and elements in a stage do not necessarily increase in the order of stages in the filter.

19. The tunable filter of claim 1 which is operated in reflective mode.

20. A tunable optical filter comprising one or more optically coupled stages along a light propagation axis wherein a stage comprises an entrance polarizer and an exit polarizer which are oriented at a fixed angle with respect to each other, wherein the entrance polarizer of a stage defines the polarization of light entering that stage wherein one or more stages of said filter comprise N chiral smectic liquid crystal cells positioned between said polarizers and optically coupled with said polarizers said chiral smectic liquid crystal cell having two or more optical axis orientations and means for applying an electric field to said chiral smectic liquid crystal cell whereby said optic axis of said cell is rotated among said optical axis orientations wherein, when the filter has one stage, N is three or more, and when the filter has more than one stage, N is one or more.

21. The tunable optical filter of claim 20 wherein at least one of said stages comprises a fixed birefringent element.

22. The tunable optical filter of claim 21 wherein each of said stages comprises a fixed birefringent element.

23. A continuously tunable optical filter having one or more optically coupled stages wherein a stage comprises: an entrance polarizer which defines the polarization of light entering the stage and an exit polarizer which is oriented at a fixed angle with respect to the polarization of light entering the stage, a birefringent element which can be active or fixed, an achromatic quarter-waveplate and an analog chiral smectic liquid crystal cell all of which are optically coupled between said polarizers wherein said achromatic quarter-waveplate is optically coupled between said birefringent element and said analog chiral smectic liquid crystal cell and means for applying a variable electric field to said analog chiral smectic liquid crystal cell such that the optic axis of said cell be rotated with the magnitude of said rotation being dependent on the sign and magnitude of said applied field and $\alpha_{MAX}$ of said analog chiral smectic cell.

24. The tunable optical filter of claim 23 wherein said filter comprises two or more stages.

25. The tunable optical filter of claim 23 wherein said birefringent element is a fixed birefringent element.

26. The tunable optical filter of claim 25 wherein said fixed birefringent element in a stage is oriented at an angle of ±45° with respect to the direction of polarization of light entering that stage.

27. The tunable optical filter of claim 23 wherein said birefringent element is an active birefringent element.

28. The tunable optical filter of claim 27 wherein said active birefringent element is a chiral smectic liquid crystal cell.

29. The tunable optical filter of claim 28 wherein said chiral smectic liquid crystal cell is a chiral smectic C bistable SSFLC cell.

30. The tunable optical filter of claim 23 wherein said entrance and exit polarizers are oriented parallel or perpendicular with respect to one another.

31. The tunable optical filter of claim 23 wherein said analog chiral smectic liquid crystal cell cell is an electroclinic or DHF cell.

32. The tunable optical filter of claim 23 wherein said analog chiral smectic liquid crystal cell displays a maximum tilt angle of ±22.5°.

33. The tunable optical filter of claim 23 wherein said achromatic quarter-waveplate within a stage is oriented at 0 or 90° with respect to the polarization of light entering said stage.

* * * * *